(12) United States Patent
Broughton et al.

(10) Patent No.: US 9,259,808 B2
(45) Date of Patent: Feb. 16, 2016

(54) METHOD OF SERVICING A GAS TURBINE ENGINE

(71) Applicant: ROLLS-ROYCE PLC, London (GB)

(72) Inventors: Paul Broughton, Leicester (GB); Richard Peace, Derby (GB)

(73) Assignee: ROLLS-ROYCE plc, London (GB)

( * ) Notice: Subject to any disclaimer, the term of this patent is extended or adjusted under 35 U.S.C. 154(b) by 138 days.

(21) Appl. No.: 13/716,648

(22) Filed: Dec. 17, 2012

(65) Prior Publication Data
US 2013/0160291 A1    Jun. 27, 2013

(30) Foreign Application Priority Data

Dec. 22, 2011 (GB) .................................. 1122143.9

(51) Int. Cl.
*B23P 6/00* (2006.01)
*F02C 7/32* (2006.01)

(52) U.S. Cl.
CPC . *B23P 6/005* (2013.01); *F02C 7/32* (2013.01); *Y02T 50/672* (2013.01); *Y10T 29/49238* (2015.01)

(58) Field of Classification Search
CPC .............. F02C 7/32; F02C 7/26; F02C 7/264; F02C 7/266; F02C 7/22; F02C 7/222; F02C 7/00
See application file for complete search history.

(56) References Cited

U.S. PATENT DOCUMENTS

| | | | |
|---|---|---|---|
| 2,523,083 A | 9/1950 | Witkowski | |
| 2,523,504 A | 9/1950 | Ford, Jr. | |
| 2,877,544 A | 3/1959 | Gammel | |
| 3,128,214 A | 4/1964 | Lay | |
| 3,284,003 A | 11/1966 | Ciemochowski | |
| 3,494,657 A * | 2/1970 | Harper et al. | 296/208 |
| 3,612,744 A | 10/1971 | Thomas | |
| 3,700,825 A | 10/1972 | Taplin et al. | |
| 3,710,568 A | 1/1973 | Rice | |
| 4,137,888 A | 2/1979 | Allan | |
| 4,149,567 A * | 4/1979 | Weirich | 138/111 |

(Continued)

FOREIGN PATENT DOCUMENTS

| | | |
|---|---|---|
| DE | 2941950 B1 | 2/1981 |
| EP | 1741879 A1 | 1/2007 |

(Continued)

OTHER PUBLICATIONS

Aug. 5, 2013 Search Report issued in British Patent Application No. 1308033.8.

(Continued)

*Primary Examiner* — Jason L Vaughan
(74) *Attorney, Agent, or Firm* — Oliff PLC

(57) ABSTRACT

A gas turbine engine 10 is provided with rigid raft assemblies 290, which may be electrical harness raft assemblies 290 comprising electrical conductors embedded in a rigid composite material. The rigid raft assemblies 290 can be provided with engine dressings, such as pipework and ECUs to produce an electrical raft assembly. In order to assemble or dress the gas turbine engine 10, the rigid raft assemblies can be pre-prepared to incorporate at least a part of at least one gas turbine engine system/component before being installed on the gas turbine engine 10. During maintenance, whole raft assemblies can be removed and replaced with corresponding, pre-prepared assemblies. This can save considerable time during engine build and maintenance.

16 Claims, 8 Drawing Sheets

(56) References Cited

U.S. PATENT DOCUMENTS

| | | | |
|---|---|---|---|
| 4,220,912 A | 9/1980 | Williams | |
| 4,488,970 A | 12/1984 | Clark | |
| 4,671,593 A | 6/1987 | Millon-Fremillon et al. | |
| 5,004,639 A | 4/1991 | Desai | |
| 5,012,639 A | 5/1991 | Ream et al. | |
| 5,031,396 A | 7/1991 | Margnelli | |
| 5,091,605 A * | 2/1992 | Clifford | 174/650 |
| 5,138,784 A | 8/1992 | Niwa | |
| 5,142,448 A | 8/1992 | Kober et al. | |
| 5,174,110 A | 12/1992 | Duesler et al. | |
| 5,249,417 A | 10/1993 | Duesler et al. | |
| 5,435,124 A | 7/1995 | Sadil et al. | |
| 5,688,145 A | 11/1997 | Liu | |
| 5,692,909 A * | 12/1997 | Gadzinski | 439/34 |
| 5,795,172 A | 8/1998 | Shahriari et al. | |
| 5,870,824 A | 2/1999 | Lilja et al. | |
| 5,876,013 A | 3/1999 | Ott | |
| 5,885,111 A | 3/1999 | Yu | |
| 5,895,889 A | 4/1999 | Uchida et al. | |
| 6,050,853 A | 4/2000 | Ando et al. | |
| 6,157,542 A | 12/2000 | Wu | |
| 6,399,889 B1 | 6/2002 | Korkowski et al. | |
| 6,434,473 B1 | 8/2002 | Hattori | |
| 6,481,101 B2 | 11/2002 | Reichinger | |
| 6,588,820 B2 | 7/2003 | Rice | |
| 6,689,446 B2 | 2/2004 | Barnes et al. | |
| 6,702,607 B2 | 3/2004 | Kondo | |
| 6,969,807 B1 | 11/2005 | Lin et al. | |
| 6,971,650 B2 | 12/2005 | Marelja | |
| 6,971,841 B2 | 12/2005 | Care | |
| 7,002,269 B2 | 2/2006 | Angerpointer | |
| 7,010,906 B2 * | 3/2006 | Cazenave et al. | 60/226.1 |
| 7,232,315 B2 | 6/2007 | Uchida et al. | |
| 7,281,318 B2 | 10/2007 | Marshall et al. | |
| 7,389,977 B1 | 6/2008 | Fernandez et al. | |
| 7,414,189 B2 | 8/2008 | Griess | |
| 7,500,644 B2 | 3/2009 | Naudet et al. | |
| 7,506,499 B2 * | 3/2009 | Fert et al. | 60/226.1 |
| 7,516,621 B2 | 4/2009 | Suttie et al. | |
| 7,525,816 B2 | 4/2009 | Sawachi | |
| 7,543,442 B2 * | 6/2009 | Derenes et al. | 60/226.1 |
| 7,661,272 B2 * | 2/2010 | Gagneux et al. | 60/796 |
| 7,745,730 B2 | 6/2010 | Bailey | |
| 7,762,502 B2 | 7/2010 | Mesing et al. | |
| 7,837,497 B1 | 11/2010 | Matsuo et al. | |
| 7,862,348 B2 | 1/2011 | Strauss | |
| 8,038,104 B1 | 10/2011 | Larkin | |
| 8,137,524 B2 | 3/2012 | Berggren et al. | |
| 8,317,524 B2 | 11/2012 | Bailey | |
| 8,491,013 B2 | 7/2013 | Peer et al. | |
| 8,522,522 B2 | 9/2013 | Poisson | |
| 8,581,103 B2 | 11/2013 | Puertolas | |
| 8,794,584 B2 | 8/2014 | Shimada et al. | |
| 8,937,254 B2 | 1/2015 | Wen et al. | |
| 9,010,716 B2 | 4/2015 | Kobori | |
| 9,040,821 B2 | 5/2015 | Blanchard et al. | |
| 2002/0086586 A1 | 7/2002 | Shi et al. | |
| 2002/0170729 A1 | 11/2002 | Murakami et al. | |
| 2003/0095389 A1 | 5/2003 | Samant et al. | |
| 2003/0155467 A1 | 8/2003 | Petrenko | |
| 2004/0065092 A1 | 4/2004 | Wadia et al. | |
| 2004/0238687 A1 | 12/2004 | Jones et al. | |
| 2004/0266266 A1 | 12/2004 | Lai | |
| 2004/0266274 A1 | 12/2004 | Naudet et al. | |
| 2006/0272340 A1 | 12/2006 | Petrenko | |
| 2006/0278423 A1 | 12/2006 | Ichikawa et al. | |
| 2007/0029454 A1 | 2/2007 | Suttie et al. | |
| 2007/0084216 A1 | 4/2007 | Mazeaud et al. | |
| 2007/0129902 A1 | 6/2007 | Orbell | |
| 2008/0128048 A1 | 6/2008 | Johnson et al. | |
| 2008/0179448 A1 | 7/2008 | Layland et al. | |
| 2008/0185478 A1 | 8/2008 | Dannenberg | |
| 2008/0245932 A1 | 10/2008 | Prellwitz et al. | |
| 2009/0175718 A1 | 7/2009 | Diaz et al. | |
| 2009/0189051 A1 | 7/2009 | Love | |
| 2009/0230650 A1 | 9/2009 | Mayen et al. | |
| 2009/0242703 A1 | 10/2009 | Alexander et al. | |
| 2009/0277578 A1 | 11/2009 | Sung et al. | |
| 2009/0289232 A1 | 11/2009 | Rice | |
| 2010/0162726 A1 | 7/2010 | Robertson et al. | |
| 2010/0261365 A1 | 10/2010 | Sakakura | |
| 2010/0308169 A1 | 12/2010 | Blanchard et al. | |
| 2011/0011627 A1 | 1/2011 | Puertolas | |
| 2011/0016882 A1 | 1/2011 | Woelke et al. | |
| 2011/0017879 A1 | 1/2011 | Woelke et al. | |
| 2011/0053468 A1 | 3/2011 | Vontell | |
| 2011/0111616 A1 | 5/2011 | Chang et al. | |
| 2011/0120748 A1 | 5/2011 | Bailey | |
| 2011/0315830 A1 | 12/2011 | Eshima et al. | |
| 2012/0012710 A1 | 1/2012 | Yamaguchi et al. | |
| 2012/0103685 A1 * | 5/2012 | Blanchard et al. | 174/72 A |
| 2012/0111614 A1 | 5/2012 | Free | |
| 2012/0149232 A1 | 6/2012 | Balzano | |
| 2012/0312022 A1 | 12/2012 | Lam et al. | |
| 2013/0189868 A1 | 7/2013 | Fitt et al. | |
| 2013/0316147 A1 | 11/2013 | Douglas et al. | |

FOREIGN PATENT DOCUMENTS

| | | |
|---|---|---|
| EP | 1 760 291 A2 | 3/2007 |
| EP | 1 762 714 A2 | 3/2007 |
| EP | 2279852 | 2/2011 |
| EP | 2 590 270 A2 | 5/2013 |
| FR | 2871284 A1 | 12/2005 |
| GB | 1260339 A | 1/1972 |
| GB | 2152147 A | 7/1985 |
| GB | 2477337 A | 8/2011 |
| JP | A-63-285808 | 11/1988 |
| JP | A-4-167376 | 6/1992 |
| JP | A-4-223067 | 8/1992 |
| JP | A-5-129040 | 5/1993 |
| JP | A-2000-299151 | 10/2000 |
| WO | 2009/118561 A1 | 10/2009 |
| WO | WO 2010/075390 A2 | 7/2010 |
| WO | WO 2011/061074 A1 | 5/2011 |
| WO | WO 2011/117609 | 9/2011 |
| WO | WO 2011/127996 A1 | 10/2011 |

OTHER PUBLICATIONS

Broughton et al., Pending U.S. Appl. No. 14/100,745, filed Dec. 9, 2013.
Aug. 15, 2014 Office Action issued in U.S. Appl. No. 13/716,497.
Fitt et al., Pending U.S. Appl. No. 13/792,851, filed Mar. 11, 2013.
Apr. 23, 2014 European Search Report issued in European Patent Application No. 12 19 7402.
Apr. 24, 2014 European Search Report issued in European Patent Application No. 13 19 5848.
Oct. 25, 2013 European Search Report issued in European Patent Application No. 13 15 8531.
Broughton et al., U.S. Appl. No. 14/100,745, filed Dec. 9, 2013.
Apr. 20, 2012 Search Report issued in British Patent Application No. GB1122140.5.
Apr. 19, 2012 Search Report issued in British Patent Application No. GB1122143.9.
Jun. 21, 2012 Search Report issued in British Patent Application No. GB1203991.3.
Jul. 31, 2012 Search Report issued in British Patent Application No. GB1207733.5.
Aug. 7, 2012 Search Report issued in British Patent Application No. GB1207735.0.
Oct. 23, 2012 Search Report issued in British Patent Application No. GB1212221.4.
Nov. 7, 2012 Search Report issued in British Patent Application No. GB1212223.0.
Broughton et al., Pending U.S. Appl. No. 13/716,497, filed Dec. 17, 2012.
Broughton et al., Pending U.S. Appl. No. 13/716,439, filed Dec. 17, 2012.
Broughton et al., Pending U.S. Appl. No. 13/716,254, filed Dec. 17, 2012.

(56) References Cited

OTHER PUBLICATIONS

Willmot et al., Pending U.S. Appl. No. 13/716,300, filed Dec. 17, 2012.
Willmot et al., Pending U.S. Appl. No. 13/716,239, filed Dec. 17, 2012.
Broughton et al., Pending U.S. Appl. No. 13/716,587, filed Dec. 17, 2012.
Maszczk et al., Pending U.S. Appl. No. 13/716,796, filed Dec. 17, 2012.
Willmot et al., Pending U.S. Appl. No. 13/716,808, filed Dec. 17, 2012.
Broughton et al., Pending U.S. Appl. No. 13/716,708, filed Dec. 17, 2012.
Dalton et al., Pending U.S. Appl. No. 13/716,244, filed Dec. 17, 2012.
Broughton et al., Pending U.S. Appl. No. 13/716,503, filed Dec. 17, 2012.
Broughton et al., Pending U.S. Appl. No. 13/716,516, filed Dec. 17, 2012.
Nov. 10, 2014 Office Action issued in U.S. Appl. No. 13/716,300.
Jun. 12, 2015 Office Action in U.S. Appl. No. 13/716,254.
Jun. 19, 2015 Office Action issued in U.S. Appl. No. 13/716,244.
Jun. 5, 2015 Office Action issued in U.S. Appl. No. 13/716,708.
Nellis and Klein, "Heat Transfer", 2009, Campbridge University pp. 748-751.
Feb. 25, 2015 Office Action issued in U.S. Appl. No. 13/716,497.
Mar. 11, 2015 Office Action issued in U.S. Appl. No. 13/716,300.
Jul. 28, 2015 Office Action issued in U.S. Appl. No. 13/716,796.
Aug. 13, 2015 Office Action issued in U.S. Appl. No. 13/716,516.
Aug. 14, 2015 Office Action issued in U.S. Appl. No. 13/716,239.
Jul. 17, 2015 Office Action issued in U.S. Appl. No. 13/716,497.
Aug. 27, 2015 Office Action issued in U.S. Appl. No. 13/792,851.
Sep. 4, 2015 Office Action issued in U.S. Appl. No. 13/716,503.
Sep. 23, 2015 Office Action issued in U.S. Appl. No. 13/716,439.
Oct. 7, 2015 Office Action issued in U.S. Appl. No. 13/716,587.
Dec. 1, 2015 Office Action issued in U.S. Appl. No. 13/716,808.

* cited by examiner

METHOD OF SERVICING A GAS TURBINE ENGINE

CROSS-REFERENCE TO RELATED APPLICATIONS

This application is based upon and claims the benefit of priority from British Patent Application Number GB1122143.9 filed 22 Dec. 2011, the entire contents of which are incorporated by reference.

BACKGROUND OF THE INVENTION

1. Field of the Invention

This invention relates to assembly and maintenance of gas turbine engines. In particular, aspects of the invention relate to the use of pre-prepared rigid raft assemblies in the assembly and/or servicing of a gas turbine engine.

2. Description of the Related Art

A typical gas turbine engine comprises a number of components and/or systems that need to be attached thereto in order for the gas turbine engine to function in the intended manner. Such systems and/or components include, for example, fluid systems, electrical systems, monitoring systems and various electronic control units. These systems/components may be referred to as auxiliary (or ancillary) components/systems, and/or as engine dressings.

By way of example, FIG. 1 of the accompanying drawings shows a typical gas turbine engine including two conventional wiring harnesses 102, 104, each provided with a respective connector component 106, 108 for connection to circuitry, which may be for example accommodated within the airframe of an aircraft in which the engine is installed. A conventional gas turbine engine such as that shown in FIG. 1 may also comprise a number of fluid pipes 116. Such fluid pipes 116, which may be for carrying any suitable fluid, such as liquid, gas or a combination thereof, may be mounted to the engine at available locations.

Such fluid and/or electrical systems/components are conventionally mounted directly to the engine, often using separate mounts for each system/component. Thus, the various systems/components conventionally form a complex array of pipes, leads, wires connectors and other components, each of which typically requires individually mounting.

With regard to the electrical system, a typical gas turbine engine has a substantial number of electrical components which serve, for example, to sense operating parameters of the engine and/or to control actuators which operate devices in the engine. Such devices may, for example, control fuel flow, variable vanes and air bleed valves. The actuators may themselves be electrically powered, although some may be pneumatically or hydraulically powered, but controlled by electrical signals.

Electrical power, and signals to and from the individual electrical components, are commonly transmitted along conductors. Conventionally, such conductors may be in the form of wires and cables which are assembled together in the harness 102, 104. The connections between the individual components and the conventional harness are made, for example, by the multi-pin plug and socket connectors 106, 108. Similarly, communication between the harness and power, control and signalling circuitry is achieved through a multi-pin connector.

The harnesses 102, 104 are assembled from individual wires and cables which are held together over at least part of their lengths by suitable sleeving and/or braiding. Individual wires and cables, for example those indicated at 110, emerge from the sleeving or braiding to terminate at plug or socket connector components 112 for cooperation with complementary socket or plug connector components 114 on, or connected to, the respective electrical components.

Each conventional harness 102, 104 therefore comprises a multitude of insulated wires and cables. This makes the conventional harness bulky, heavy and difficult to manipulate. The conventional harnesses 102, 104 occupy significant space within a gas turbine engine (for example within the nacelle of a gas turbine engine), and thus may compromise the design of the aircraft, for example the size and/or weight and/or shape of the nacelle.

With regard to the fluid systems, these may conventionally comprise fluid pipes 116 provided to the engine, for example in spaces between the electrical harnesses. The fluid pipes 116 may have separate mounts/attachments to the gas turbine engine. The fluid pipes 116, for example in combination with other engine dressings, such as the electrical systems occupy significant space within a gas turbine engine (for example within the nacelle of a gas turbine engine), and thus may compromise the design of the engine/aircraft, for example the size and/or weight and/or shape of the nacelle.

Thus, the complex arrangement of conventional engine dressings may be difficult and time consuming to assemble and/or attach/remove from the rest of the engine, difficult to manipulate, heavy, and/or bulky.

Furthermore, because conventional engine dressings (including, for example the electrical and fluid systems) comprise a large number of components, including various individual wires and/or bundles of wires, pipes, supporting components (such as brackets or cables) and electrical and/or mechanical connectors, the assembly/disassembly process is complicated (and thus susceptible to errors) and/or time consuming. Thus, in many build and maintenance (or repair or overhaul) procedures on a gas turbine engine, removal and subsequent refitting of the conventional engine dressings may account for a very significant portion of the operation time and/or account for a significant proportion of the potential assembly errors.

Still further, the conventional dressings, such as the fluid pipes and/or the electrical conductors in the conventional harnesses, may be susceptible to mechanical damage. For example, mechanical damage may occur during installation (due to exposed components and/or complicated assembly procedures) and/or during service (for example due to vibration). In order to reduce the likelihood of damage to the conductors in a conventional harness, protection such as sleeves/braiding may need to be reinforced/provided, adding still further weight and reducing the ease with which they can be manipulated.

OBJECTS AND SUMMARY OF THE INVENTION

According to an aspect of the invention, there is provided a method of servicing a gas turbine engine. The method comprises removing a first rigid raft assembly from the gas turbine engine. The first rigid raft assembly incorporates (for example comprises) at least a part of at least one component or system of the gas turbine engine. The first rigid raft assembly may, for example, comprise at least a part of at least two components or systems of the gas turbine engine. The method comprises installing a second, pre-prepared, rigid raft assembly onto the gas turbine engine in place of the first raft assembly.

Removing the first rigid raft assembly may comprise detaching a fixing (or mount or bracket) through which the first rigid raft is attached (or mounted) to the rest of the gas turbine engine. Installing the second, pre-prepared, rigid raft assembly may comprise attaching (or mounting) it to the rest of the gas turbine engine using a fixing (or mount or bracket).

Replacing a first rigid raft assembly with a pre-prepared second rigid raft assembly may significantly reduce the out-of-service time of the gas turbine engine being serviced. The second rigid raft assembly may be prepared and optionally tested, for example whilst the first rigid raft assembly is still operational on the gas turbine engine. Furthermore, as discussed elsewhere herein, the assembly/disassembly of rigid raft assemblies, such as electrical harness raft assemblies and/or dressed rigid raft assemblies (described in greater detail below), may be particularly quick and straightforward, for example compared with conventional electrical harnesses and/or engine dressings.

Use of rigid raft assemblies may allow maintenance procedures to be advantageously adapted. For example, some maintenance procedures may only require access to a certain portion of the gas turbine engine that only requires a part of a component/system (which may be a part of a conventional harness/dressing) to be removed. It may be difficult and/or time consuming, or not even possible, to only remove the required part of a conventional component/system from a gas turbine engine. However, it may be relatively straightforward to only remove the relevant rigid raft assembly, for example by simply disconnecting it from the engine and any other rigid raft assemblies/components to which it is connected. Decreasing maintenance times has the advantage of, for example, reducing out-of service times (for example off-wing times for engines that are used on aircraft).

Use of rigid raft assemblies may significantly reduce the build/assembly/disassembly time of an engine. For example, use of rigid raft assemblies may significantly reduce the part count involved in engine assembly compared with conventional engine assembly. Pre-preparing the rigid raft assemblies may further reduce the number and/or complexity of the operations required during engine assembly/disassembly (for example to assemble/install an electrical harness and/or other components/systems, which may be referred to in general as engine dressing).

Thus, assembling/disassembling a gas turbine engine installation using rigid raft assemblies may reduce out-of-service time of the engine and/or reduce the possibility of errors occurring during servicing.

The first and second rigid raft assemblies may comprise any feature described herein. The first and second rigid raft assemblies may be substantially the same as each other. For example, they may be provided with the same (or similar) connectors/sockets and/or have the same (or similar) components/systems mounted thereon (i.e. they may be provided with the same or similar dressings). The second rigid raft assembly may be a serviced (which may mean inspected and/or repaired and/or refurbished) version of the first rigid raft assembly. The second rigid raft assembly may be an upgraded version of the first rigid raft assembly, for example incorporating upgraded components/systems.

The first and second rigid raft assemblies may comprise a part or all of any system and/or component of the gas turbine engine. The system(s) and/or component(s) (or parts thereof) may be provided with (or incorporated into) the first and second rigid raft assemblies in any appropriate way.

The first and second rigid raft assemblies may be electrical harness rafts (which may be referred to as electrical harness raft assemblies) such as described below and elsewhere herein. As such, the rigid raft assemblies may have electrical conductors embedded in a rigid material. The electrical conductors may be at least a part of an electrical system arranged to transfer electrical signals around the engine. Thus, the first and second rigid raft assemblies may incorporate at least a part of an electrical system.

The electrical signals transferred around the engine using the electrical harness rafts may take any form. For example, the electrical signals may include, by way of non-limitative example, electrical power and/or electrical control/communication signals and/or any other type of transmission through an electrical conductor. Transmission of signals around the engine may mean transmission of signals between (to and/or from) any number of components/systems in the engine and/or components/system of a structure (such as an airframe) to which the gas turbine engine is (or is configured to be) connected/installed in. In other words, an electrical harness raft may be used to transfer/communicate any possible electrical signals in any part of a gas turbine engine installation or a related (for example electrically and/or mechanically connected) structure/component/system.

The electrical conductors embedded in the rigid material may be used to transfer electrical signals around a gas turbine engine. Embedding electrical conductors in a rigid material (to create an electrical harness raft) has a great number of advantages over transferring electrical signals using a conventional harness.

The electrical harness raft may provide greater protection to the electrical conductors than a conventional harness. For example, the rigid and/or hard material (which may be a rigid composite material, for example) in which the conductors are embedded may provide greater protection (for example greater mechanical protection) to the embedded conductors, for example due to being resistant to breaking and/or snapping and/or piercing and/or puncturing. Purely by way of example, the use of electrical harness rafts may reduce, or substantially eliminate, the chance of foreign bodies coming into contact with the electrical conductors, for example through fluid ingress. The electrical harness rafts may provide improved protection to the electrical conductors during manufacture/assembly of the raft/gas turbine installation, as well as during service of the gas turbine engine. This may result in lower maintenance costs, for example due to fewer damaged components requiring replacement/repair and/or due to the possibility of extending time intervals (or service intervals) between inspecting the electrical harnesses, for example compared with a conventional harness.

The electrical harness rafts may be a particularly lightweight solution for transferring electrical signals around an engine. For example, an electrical harness raft may be lighter, for example significantly lighter, than a conventional harness required to transmit a given number of electrical signals. The reduced weight may be particularly advantageous, for example, when used on gas turbine engines on aircraft. Reduced weight means that the electrical harness rafts are easier to handle during assembly/servicing, and has performance advantages, for example in terms of engine fuel consumption.

Electrical harness rafts may be more easily packaged and/or more compact, for example than conventional harnesses. Indeed, the electrical harness rafts can be made into a very wide range of shapes as desired. This may be achieved, for example, by manufacturing the electrical harness rafts using a mould conforming to the desired shape. As such, each electrical harness raft may be shaped, for example, to turn through a tighter corner (or smaller bend radius) than a conventional harness. The electrical harness rafts may thus provide a particularly compact solution for transferring electrical signals around a gas turbine engine. The electrical harness rafts may be readily shaped to conform to neighbouring components/regions of a gas turbine engine, for example components/regions to which the particular electrical harness raft is attached.

At least one of the electrical conductors embedded in the electrical harness raft may be an electrically conductive wire. The or each electrically conductive wire may be surrounded by an electrically insulating sleeve. As such, individual wires may be laid into (or embedded in) the electrical harness raft, and each wire may be used to transfer one or more electrical signals through the raft and around the engine. Providing a sleeve to the individual wires may provide extra mechanical and/or electrical protection/isolation.

At least some of the electrical conductors may be provided in a flexible printed circuit. Thus, at least some of the electrical conductors may be provided as electrically conductive tracks in a flexible substrate. The flexible printed circuit may be flexible before being embedded in the rigid composite material.

Providing the electrical conductors as tracks in a flexible printed circuit may allow the size of the resulting electrical harness raft to be reduced further and/or substantially minimized. For example, many different electrical conductors may be laid into a flexible printed circuit in close proximity, thereby providing a compact structure. Advantageously, the flexible substrate of a single flexible printed circuit may provide electrical and/or mechanical protection/isolation to a large number of electrical conductors.

Any given electrical harness raft may be provided with one or more electrical wires embedded therein (which may be sheathed) and/or one or more flexible printed circuits embedded therein. As such, a given electrical harness raft may have wires and flexible printed circuits laid therein.

It will be appreciated that, where the raft assembly comprises embedded electrical conductors (whether they are provided as embedded electrical wires or as conductive tracks in a flexible printed circuit embedded in the rigid material) may be described as being fixed in position by the rigid material, for example relative to the rest of the electrical harness raft. It will also be appreciated that any embedded electrical conductors may be said to be surrounded by the rigid material and/or buried in the rigid material and/or integral with (or integrated into) the rigid material.

Thus, the first and second rigid raft assemblies may be electrical harness rafts, with the at least one component or system (or part thereof) that the rigid raft assemblies comprise including an electrical system. Using an electrical harness raft assembly may reduce/eliminate the use of conventional electrical harnesses. This may reduce assembly time and/or reduce the possibility of errors occurring during assembly. For example, rather than having to install/assemble a great number of wires and/or wiring looms together on the engine installation, it may only be necessary to attach a relatively small number of electrical harness raft assemblies, which themselves may be pre-prepared, and/or straightforward to handle, position, secure and/or connect. Rigid raft assemblies formed using electrical harness rafts may or may not comprise at least a part of another component or system of the gas turbine engine.

The first and second rigid raft assemblies may be dressed rigid raft assemblies. Such dressed rigid raft assemblies may comprise a rigid mounting surface on which at least a part of at least one of the components or systems of the gas turbine engine is mounted, or attached. Thus, regardless of whether or not the rigid raft assemblies comprise electrical conductors (so as to be an electrical harness raft assembly), they may have at least a part of a component or system mounted thereto (so as to be a dressed rigid raft assembly). Thus, the rigid raft assemblies may be (or have features of) electrical harness raft assemblies, dressed rigid rafts, or both. For example, the rigid mounting surface of a dressed rigid raft assembly may be formed by the rigid material in which the electrical conductors of an electrical harness assembly are embedded. The rigid raft assemblies may be, for example, rigid composite raft assemblies, having a fibre and resin construction.

A dressed rigid raft assembly may comprise at least a part of one or more components and/or systems, for example ancillary, auxiliary or control components/systems, attached thereto. The rigid mounting surface may provide a stable, regular and convenient platform on which to mount the various systems/components. The components/systems may be mounted in any suitable manner, such as using bespoke and/or standard brackets.

The second rigid raft assembly may be dressed by the time that the first rigid raft assembly is removed from the engine. Dressing the raft prior to installation on/with the gas turbine engine may be a particularly efficient way of reducing the assembly time of a gas turbine engine and/or reducing the complexity of the assembly. Components and/or systems (dressings) can be provided to/on the raft prior to the assembly process. This may mean that those systems/components do not themselves need to be attached/connected to the engine during assembly (or at least their connection to the engine is greatly simplified), thereby reducing engine assembly time. This may be particularly advantageous for example due to reduced overall assembly/disassembly time and/or due to reducing the time (and/or the proportion of time) that the engine is required to be in the relatively expensive assembly/disassembly facility.

In embodiments in which the rigid raft assemblies are dressed rigid raft assemblies, the rigid mounting surface of each of the first and second rigid raft assemblies may have a fluid pipe for transferring fluid around the engine attached thereto. The fluid pipe may be arranged to carry any fluid as desired, including gas (such as cooling air, sealing air, and/or muscle air (for example for pneumatic systems)) or liquid (such as fuel, water, oil and/or hydraulic fluid). Of course, more than one set of fluid pipes, for example for carrying different or the same fluids, may be mounted on the same rigid raft assembly. One or more fluid pipes may be mounted on any one rigid raft assembly. The pipe may be at least a part of a fluid transfer system. Thus, the first and second rigid raft assemblies may incorporate at least a part of a fluid system (in addition or as an alternative to an electrical system).

In such an arrangement, the step of removing the first rigid raft assembly may comprise disconnecting the respective pipe from another part of the fluid transfer system. The step of installing the pre-prepared second rigid raft assembly may comprise connecting the respective pipe the other part of the fluid transfer system. Such other part of the fluid transfer system may be, for example, another pipe mounted on another rigid raft assembly. This may be a secure, straightforward, and quick method for assembling and/or disassembling a fluid transfer system on a gas turbine engine. For example, once various parts of the fluid transfer system are mounted on rigid raft assemblies (for example during preparation of a raft prior to engine assembly), it may only require complimentary attachments on corresponding parts of the fluid transfer system to be connected together (or detached) in order to provide the entire fluid transfer system to the gas turbine engine, or remove it therefrom.

The first and second rigid raft assemblies may each have an ECU attached to its respective mounting surface. Such an ECU may be, for example, an EEC (Electronic Engine Controller) and/or an Engine Health Monitoring Unit (EMU). An ECU may, for example, be provided as a part of another component.

The rigid raft assembly may provide a convenient surface on which to mechanically mount such an ECU. Embodiments having an electrical harness raft assembly may be provided with (for example have embedded therein) an electrical connector/socket that can be connected to a corresponding (or complimentary) connector on an ECU which may be physically mounted on the raft. Thus, such a rigid raft assembly may provide a convenient, compact, and lightweight solution for mounting and/or connecting ECUs to the engine, and/or for electrically connecting the ECU to one or more of the electrical conductors in an electrical harness raft assembly on which it may be mounted.

Additionally or alternatively, another component or system, or part thereof, of a gas turbine engine may be provided with (or by) the first and second rigid raft assemblies. For example, any part or all of one or more of the following may be provided with the rigid raft assembly: a fire detector and/or fire detection element; a thermocouple for measuring air temperature (for example within a particular engine zone); vibration monitoring processing equipment (for example a signal processing component/box containing electronics used to process a vibration signal that may be measured elsewhere in the engine); equipment for measuring fluid quality (for example a probe for oil debris monitoring may be provided to one or more pipes mounted to the raft, and/or a signal processing box for processing the oil quality measurements may be mounted on the box); and pressure sensors and/or signal processing equipment, for example for fluid pipes mounted on the rafts.

In embodiments in which the rigid raft assembly comprises an electrical harness raft assembly, the (or each) electrical harness raft assembly may have embedded therein (or may be provided with) at least one electrical connector (or socket) that is in electrical contact with at least one of the respective electrical conductors embedded in the rigid material and may have terminals for connection with a complimentary connector. Providing an electrical harness raft assembly with integral electrical sockets/electrical connectors (for example by embedding them in the raft, for example to secure them in place relative to the raft) may provide a particularly quick, efficient and reliable means to connect (for example electrically connect) components to the electrical harness rafts and/or to connect electrical harness rafts together (either directly or indirectly).

According to an aspect of the invention, there is provided a method of servicing a fleet of gas turbine engines. The method comprises the steps described above and elsewhere herein of removing a first rigid raft assembly from a gas turbine engine and installing a second, pre-prepared, rigid raft assembly onto the gas turbine engine, the gas turbine engine being a first gas turbine engine. The method comprises servicing the first rigid raft assembly that has been removed from the first gas turbine engine. The method comprises installing the serviced first rigid raft assembly onto a second gas turbine engine.

The first rigid raft assembly (which, again, may be, for example, an electrical raft assembly and/or a dressed rigid raft assembly) may be held in storage before being put onto the second gas turbine engine. For example it may be held in storage before or after being serviced.

The fleet of gas turbine engines may be provided on, for example, a fleet of aircraft.

Servicing the first rigid raft assembly may involve inspection and/or removal and/or repair and/or refitting and/or refurbishing of the rigid raft assembly. Depending on the type of rigid raft assembly, this may include servicing electrical conductors embedded in the raft itself and/or any dressings, such as any connector/socket and/or component/system provided on the raft.

Accordingly, the servicing of the first rigid raft assembly can be performed without having an impact on the out-of-service time of the first gas turbine engine, from which it was removed.

The first rigid raft assembly may be tested before installing it onto the second ga turbine engine.

The build/assembly times may be additionally or alternatively reduced by pre-testing individual and/or combinations of rigid raft assemblies prior to engine assembly. This may allow electrical and/or mechanical operation of the rigid raft assemblies to be proven before installation, thereby reducing/eliminating the testing required during engine installation.

The method of servicing a gas turbine engine or a fleet of gas turbine engines may comprise removing the gas turbine engine on which the first rigid raft assembly is installed from an airframe. This step may be performed before (or indeed after) the step of removing the first rigid raft assembly from the gas turbine engine. The method may comprise refitting that gas turbine engine to an airframe after (or indeed before) the step of installing the second, pre-prepared, rigid raft assembly thereon. The airframe to which the gas turbine engine is installed may be the same as, or different to, the airframe from which it was removed. The gas turbine engine could be removed from any assembly or application in which it is installed, for example a power generation unit (such as a power station) or a vehicle (such as a boat/ship and/or an aircraft, including for example an aeroplane and a helicopter).

In any of the methods described herein in which the first rigid raft assembly is an electrical harness raft assembly, the first electrical harness raft assembly may be connected to another electrical component of the gas turbine engine using a flexible cable. The flexible cable may take any form, such as a flexible printed circuit having electrically conductive tracks in a substrate, and/or an electrically insulated conductive wire. Any combination of wires and flexible printed circuits may be used to electrically connect two electrical harness rafts together. The step of removing the first rigid raft assembly from the gas turbine engine may comprise disconnecting the flexible cable from the first electrical harness raft. The other electrical component may be, for example, another electrical harness raft assembly or an ECU. Thus, there may be a plurality of electrical harness raft assemblies (for example one, two, three, four, five, six, seven, eight, nine, ten or more than ten) provided to the gas turbine engine.

Connecting (at least) two electrical harness raft assemblies together using flexible cable(s) may be a particularly convenient and straightforward technique for providing an electrical connection between rafts on a gas turbine engine. The environment of a gas turbine engine during operation may be particularly severe, with, for example, high levels of vibration and/or differential expansion between components as the temperature changes through operation and as the components move relative to each other. Providing separate (for example more than one) electrical harness rafts and connecting at least some (for example at least two) of them together using at least one flexible cable may allow the electrical harness rafts to accommodate vibration and/or relative movement of the component(s)/assemblies to which they are attached during use. For example, flexible cable(s) used to electrically connect electrical harness rafts together (or to connect an electrical harness raft to another electrical component) may have sufficient length to accommodate such vibration and/or movement during use.

The method may comprise removing more than one rigid raft assembly from the gas turbine engine and replacing each removed rigid raft assembly with a corresponding, pre-prepared, rigid raft assembly.

According to an aspect of the invention, there is provided a method of assembling a gas turbine engine, the method comprising preparing a rigid raft assembly for installing on the gas turbine engine, the rigid raft assembly incorporating (or comprising) at least a part of at least one component or system of the gas turbine engine. The method may comprise storing the prepared rigid raft assembly in a storage facility. When the gas turbine engine requires dressing, the prepared rigid raft assembly may be installed on the rest of the gas turbine engine installation. The prepared rigid raft assembly may thus form at least a part of the engine dressing.

The prepared rigid raft assembly may take any suitable form, such as those described above in relation to the methods of servicing and/or as described elsewhere herein.

Thus, the rigid raft assembly may be an electrical harness raft assembly having electrical conductors embedded in a rigid material, the electrical conductors being at least a part of an electrical system arranged to transfer electrical signals around the engine.

Additionally or alternatively, the rigid raft assembly may be a dressed rigid raft assembly comprising a rigid mounting surface on which at least a part of at least one of the components or systems of the gas turbine engine is mounted. Such dressings, and optionally their connection to the rigid raft assembly and/or to other components, may include any dressings described herein.

Preparing a rigid raft assembly for installation may include preparing it for installation to the gas turbine engine, for example by providing fixtures and/or connectors and/or mounts and/or dressings and/or any other component to the rigid raft assembly, such as, by way of example only, those described herein.

The step of installing the prepared rigid raft assembly may comprise connecting the rigid raft assembly, including the components and/or systems incorporated by the rigid raft assembly, to the gas turbine engine. Any description provided herein in relation to installing a rigid raft assembly on a gas turbine engine may apply to this step. For example, the rafts may require mechanical connection to the gas turbine engine structure. Thus, the step of installation of the prepared rigid raft assembly may comprise attaching the rigid raft assembly to the rest of the gas turbine engine using a suitable fixing (or bracket or mount).

Electrical harness raft assemblies may require electrical connection to other electrical components (for example other electrical harness raft assemblies) of/associated with the gas turbine engine.

The step of installing a prepared rigid raft assembly according to any method described herein may comprise attaching (which may include mounting/connecting/fixing) the prepared rigid raft assembly to the rest of the gas turbine engine using at least one anti-vibration mount.

At least one of the rigid raft assemblies (for example some or all of the rigid raft assemblies) may be attached to the gas turbine engine using at least one anti-vibration mount. Using an anti-vibration mount to attach the rigid raft assembly to the gas turbine engine may reduce (or substantially eliminate) the amount (for example the amplitude and/or the number/range of frequencies) of vibration being passed to the rigid raft assembly from the gas turbine engine, for example during use. This may help to prolong the life of the rigid raft assembly. Any components that may be part of the rigid raft assembly (as discussed above and elsewhere herein) may also benefit from being mounted to the gas turbine engine via the anti-vibration mounts, through being mounted on the rigid raft assembly. This may mean that any components that would conventionally be mounted directly to the gas turbine engine and require at least a degree of vibration isolation no longer require their own dedicated anti-vibration mount. Such components may include, for example, Electronic Engine Controllers (EECs) and Engine Health Monitoring Units (EMUs). Thus, the total number of anti-vibration mounts that are required to assemble an engine may be reduced. This may reduce the number of parts required and the time taken to assemble an engine or engine installation and/or reduce the total assembled weight and/or reduce the likelihood of errors occurring during assembly.

Furthermore, components that are conventionally mounted to an engine without anti-vibration mounts (for example because of the weight and/or cost penalty), but which are now mounted to a rigid raft assembly, may benefit from vibration isolation without any weight/cost/assembly time penalty. This may reduce the possibility of damage occurring to such components and/or increase their service life. Such components may include, for example, ignitor boxes (used to provide high voltage power to engine ignitors), and pressure sensors/switches, for example for fluid systems such as oil, air, fuel, pneumatics and/or hydraulics.

The method of assembling a gas turbine engine may comprise preparing at least two rigid raft assemblies, installing at least two prepared rigid raft assemblies on the rest of the gas turbine engine, and electrically connecting the at least two prepared rigid raft assemblies together using at least one flexible cable. The flexible cable may take any suitable form, as described elsewhere herein, for example a flexible printed circuit. The flexible cable may be used to connect an electrical harness raft assembly to another electrical component.

The rigid raft assemblies may be removed from/attached to any part of the gas turbine engine, for example to the fan casing and/or core casing and/or engine bifurcation (or splitter) passing across the bypass duct of a turbofan engine. The rigid raft assemblies may be shaped to correspond to the component to which they are attached, for example to a portion of an outer surface of a fan casing to which they are mounted.

The invention will now be described, by way of example only, with reference to the accompanying Figures, in which:

DETAILED DESCRIPTION OF THE PREFERRED EMBODIMENTS

Figure 1:
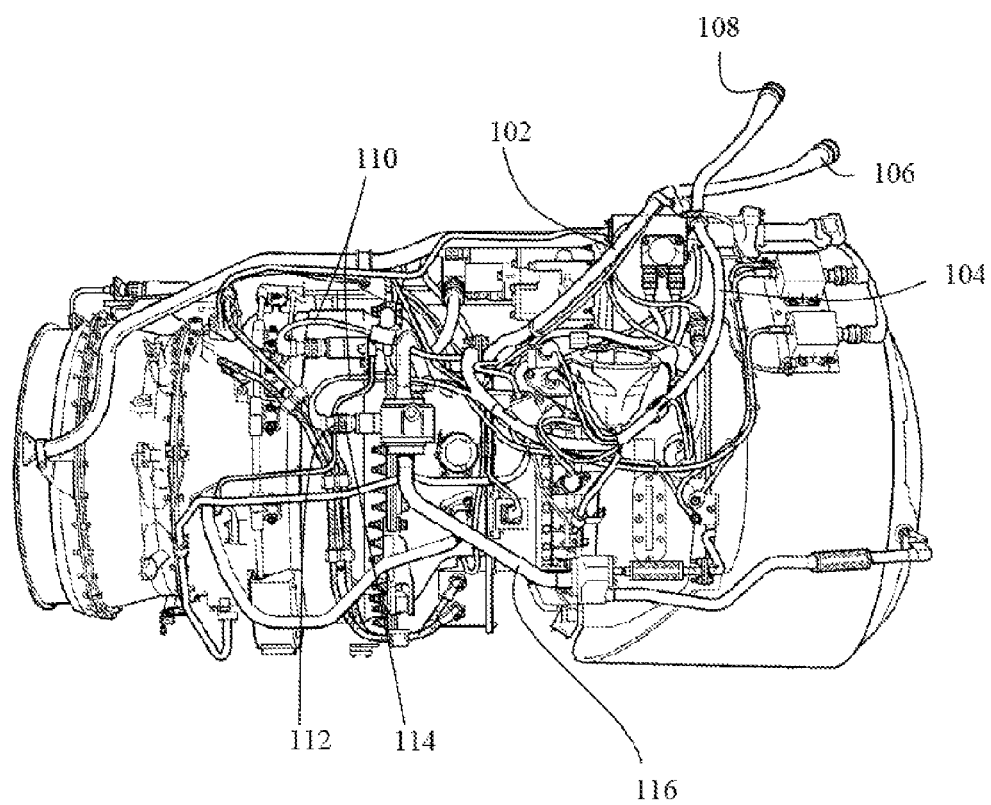
FIG. 1 shows a gas turbine engine with a conventional harness.
Figure 2:
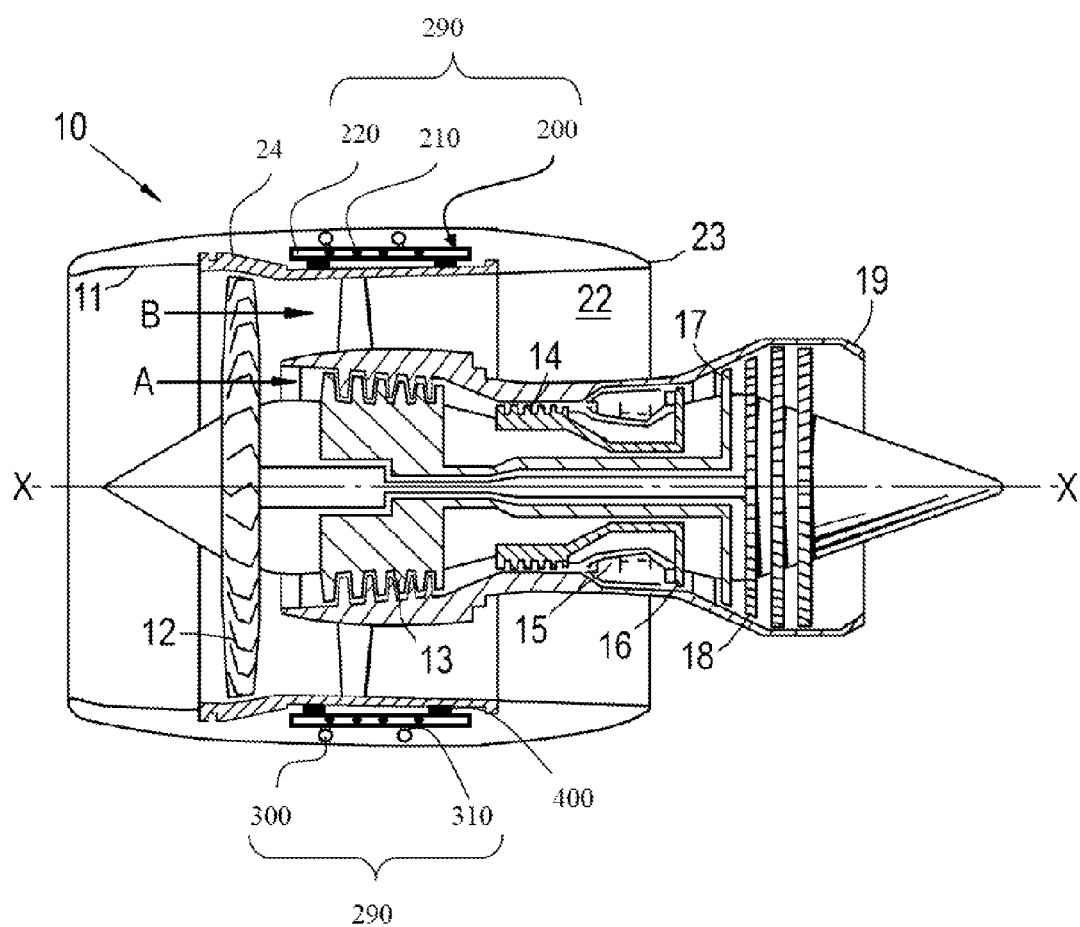
FIG. 2 shows a cross-section through a gas turbine engine having a rigid raft assembly in accordance with the present invention.

With reference to FIG. 2, a ducted fan gas turbine engine generally indicated at 10 has a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. The engine also has a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

The gas turbine engine 10 shown in FIG. 2 may be at least a part of a gas turbine engine or gas turbine engine installation assembled and/or serviced according to the present invention. The gas turbine engine 10 comprises at least one rigid raft assembly 290. The rigid raft assembly 290 may be an electrical harness raft assembly 290. The electrical harness raft assembly 290 (which may be an example of what is referred to herein as referred to herein as a raft assembly, or a rigid raft assembly) comprises an electrical harness raft 200 for transmitting/transferring electrical signals (or electricity, including electrical power and/or electrical control signals) around the engine and/or to/from the engine 10 from other components, such as components of an airframe. The function and/or construction of the electrical harness raft 200, and the electrical/mechanical connections between different electrical harness rafts 200, and between electrical harness rafts 200 and other components/systems, may be as described above and elsewhere herein.

In FIG. 2, the electrical harness raft 200 comprises at least one electrical conductor 210 embedded in a rigid composite material 220. In the FIG. 2 embodiment, the electrical harness raft 200 is provided with a further gas turbine system in the form of fluid pipes or conduits 300 (which may, for example carry liquid, such as fuel, and/or gas, such as cooling and/or sealing air for cooling/sealing components of the gas turbine engine 10). Thus, in FIG. 2, the electrical harness raft assembly 290 incorporates part of an electrical system 210 and part of a fluid system 300. The fluid pipes 300 are attached to the raft 200 using mounting brackets 310. Alternatively or additionally, in some embodiments the electrical harness raft assemblies 290 may comprise (for example by having mounted on or to the electrical harness raft 200) other systems and/or components relating to the gas turbine engine 10, such as ECUs and/or EECs.

Some rafts 200 may not have any additional components and/or systems mounted thereon. Such electrical harness rafts 200 that do not have any additional components and/or systems mounted thereon may still be referred to as electrical harness raft assemblies, and may be a rigid raft assembly 200/290 in accordance with the invention. Thus, the electrical harness raft assembly 290 (which is a type of rigid raft assembly 290) may simply be an electrical harness raft 200, without comprising additional components/systems.

Whilst the description herein focuses on rigid raft assemblies 200/290 that have electrical conductors embedded therein (and thus may be referred to as electrical harness raft assemblies), other rigid raft assemblies 200/290 that are in accordance with the invention may not have electrical conductors 210 embedded therein. Such rigid raft assemblies 200/290 that do not have electrical conductors 210 embedded therein may be dressed rigid raft assemblies that incorporate (for example have mounted thereon) other components/systems of a gas turbine engine.

The raft assembly 290 in FIG. 2 is connected to (for example mounted on) the gas turbine engine 10 using a mount 400. In FIG. 2, the raft assembly 290 is connected to a fan casing 24 of the gas turbine engine 10 using the mount 400 between the raft 200 and the gas turbine engine 10. The raft assembly 290 may thus be radially outward of the fan casing 24, between the fan casing 24 and the outer surface (or nacelle) of the assembled engine 10. The raft assembly 290 (or other raft assemblies 290) may, however, be connected to other parts of the gas turbine engine 10. The mount 400 may be any suitable mount. By way of example, the mount 400 may be an anti-vibration (or AV) mount configured to reduce or substantially eliminate vibration from components of the gas turbine engine 10 being passed to the rigid raft assembly 290, and thus to any components/systems 300 mounted thereon/connected to the raft 200 as well as to the raft 200 itself.

The electrical harness rafts 200 (which, it is emphasised, may on their own be an example of a rigid raft assembly 200/290 in accordance with the invention) comprise electrical conductors 210 provided in a rigid material. Any rigid material may be suitable, such as a rigid composite material 220. Any suitable method may be used to construct the electrical harness rafts 200.

Figure 3:
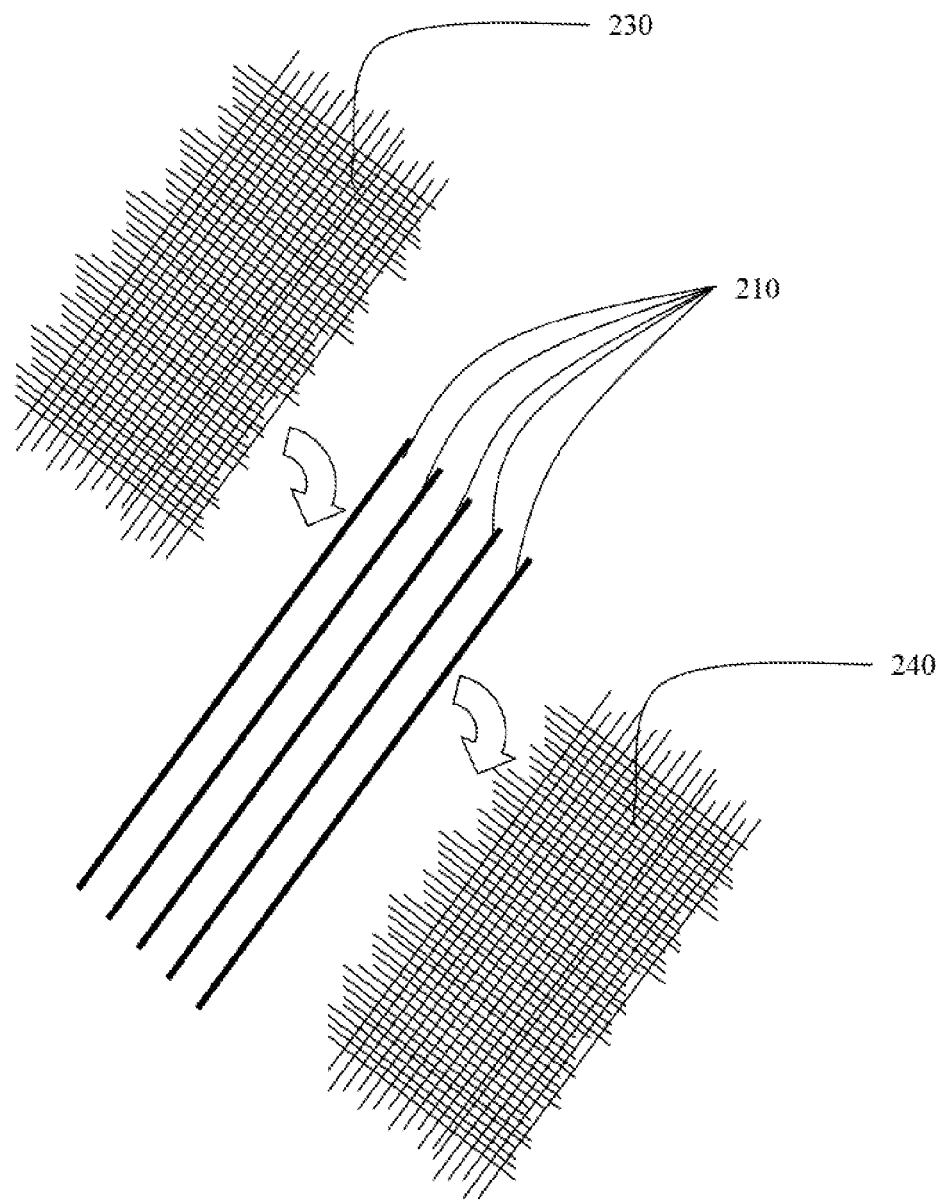
FIG. 3 shows a schematic of an electrical harness raft assembly prior to assembly.

FIG. 3 shows components of an example of an electrical harness raft 200 prior to one method of construction. The electrical conductors 210 are provided between two layers of material 230, 240 that, after construction, form the rigid material 220. The material 230, 240 may be a fibre and resin compound. Such a fibre and resin compound may, after suitable treatment (for example heat treatment) produce a rigid composite material 220, for example an organic matrix composite. In the example of FIG. 3, the fibre and resin compound is formed of a sheet of interwoven fibres, or strands. The strands in FIG. 3 extend in perpendicular directions, although the strands may extend in any one or more directions as required.

Any suitable fibres may be used, such as carbon fibres, glass fibres, aramid fibres, and/or para-aramid fibres. The fibres may be of any type, such as woven and/or chopped. Any suitable resin may be used, such as epoxy, BMI (bismaleimide), PEEK (polyetheretherketone), PTFE (polytetraflouroethylene), PAEK (polyaryletherketone), polyurethane, and/or polyamides (such as nylon).

Any suitable material may be used for the rigid material 220. For example, the rigid material 220 need not be a fibre/resin, or a composite, material. For example, the electrical conductors may be embedded in any one or more of the following materials: epoxy, BMI (bismaleimide), PEEK (polyetheretherketone), PTFE (polytetraflouroethylene), PAEK (polyaryletherketone), polyurethane, and/or polyamides (such as nylon). Thus, fibres may or may not be included in such materials that may form the rigid material 220.

The electrical conductors 210 (which may, as described in more detail below, be of any form, such as conductive wires, insulated conductive wires, and/or printed flexible circuits such as those described herein in relation to FIGS. 8 to 11) may be placed in any desired arrangement between the first and second layers 230, 240. Prior to any treatment, both the first and second layers 230, 240 and the electrical conductors 210 may be flexible, for example supple, pliable or malleable. As such, when the layers 230, 240 and the electrical conductors 210 are placed together, they may be moulded, or formed, into any desired shape. For example, the layers 230, 240 and the electrical conductors 210 may be placed into a mould (which may be of any suitable form, such as a glass or an aluminium mould) having the desired shape. The desired shape may be, for example, a shape that corresponds to (for example is offset from) a part of a gas turbine engine, such as, by way of example only, at least a part of a casing, such as an engine fan casing or engine core casing. This may enable the final raft to adopt shapes that are curved in two-dimensions or three-dimensions.

In order to produce the electrical harness raft 200 from the material layers 230, 240 and the electrical conductors 210, the assembly (which may be in a suitably shaped mould, as described above) may be subject to a suitable hardening, stiffening, or setting treatment. Such a treatment may involve raising the temperature (i.e. heat treatment) and/or applying increased pressure. The treatment may be conducted in, for example, an autoclave. In this way, the electrical conductors 210 may be said to be sandwiched between the upper and lower material layers 230, 240.

Any suitable method could be used to produce the rigid raft 200. For example, the strands/fibres need not be pre-impregnated with the resin. Instead, the fibres/strands could be put into position (for example relative to the electrical conductors) in a dry state, and then the resin could be fed (or pumped) into the mould. Such a process may be referred to as a resin transfer method.

In embodiments that do not have electrical conductors embedded in the rigid raft, similar construction methods may be used, but without the step of sandwiching the wires. Alternatively, any other suitable construction method may be used.

After the treatment, the rigid electrical harness raft 200 is set in the desired shape. Suitable electrical connectors and/or sockets may be fitted to the raft 200. Such connectors may be fitted prior to stiffening treatment of the material layers 230, 240 and the electrical conductors 210, or after such treatment. The connectors may be in electrical connection with the conductors 210 and may have pins or connectors for connection (electrical and/or mechanical) to other components of the gas turbine engine 10, as discussed in greater detail elsewhere herein.

Figure 4:
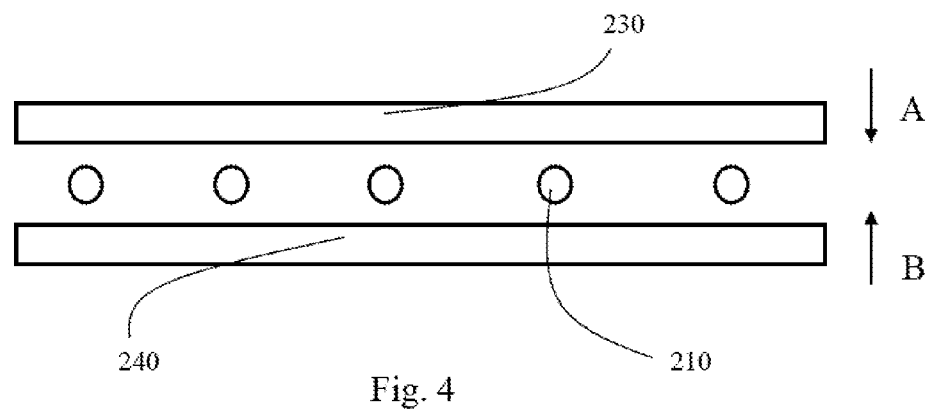
FIG. 4 shows a schematic of a cross-section through an electrical harness raft assembly prior to assembly.

FIG. 4 shows an example of a cross-section through upper and lower material layers 230, 240 and electrical conductors 210 prior to being placed together (by moving the upper layer 230 in the direction of arrow A and the lower layer 240 in the direction of arrow B) and treated to produce the electrical harness raft 200. The upper and lower layers 230, 240 in the example shown in FIG. 4 (and FIG. 6, discussed below) may comprise at least one layer, for example multiple layers, of fibre and/or fibre and resin compound.

Figure 5:
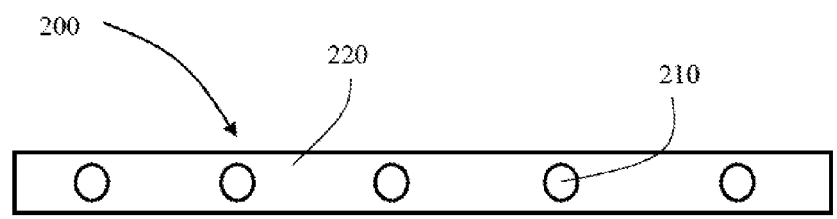
FIG. 5 shows a schematic of a cross-section through the electrical harness raft assembly of FIG. 4 after assembly.

FIG. 5 shows a cross-section through the electrical harness raft 200 produced by the FIG. 4 arrangement, for example after stiffening treatment. The FIG. 5 raft 200 has five individual electrical conductors 210, but the electrical harness raft 200 could have any number of electrical conductors 210 embedded therein, for example fewer than 5, at least 5, at least 10, at least 50, at least 100.

Figure 6:
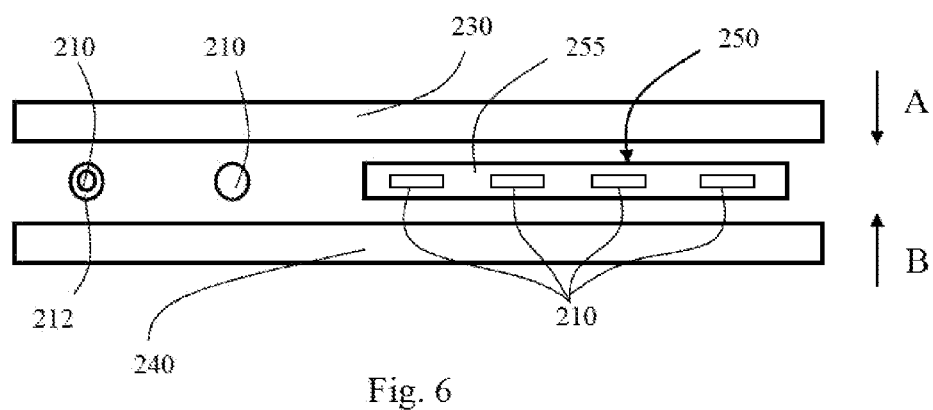
FIG. 6 shows a schematic of a cross-section through an electrical harness raft assembly prior to assembly.
Figure 7:
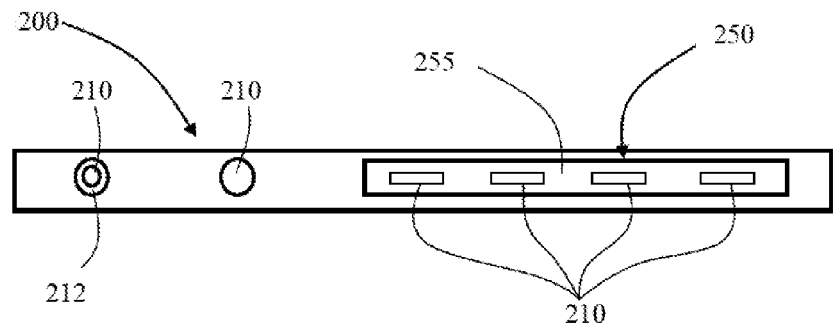
FIG. 7 shows a schematic of a cross-section through the electrical harness raft assembly of FIG. 6 after assembly.

FIG. 6 shows an example of a cross-section through an alternative arrangement of conductors between the upper and lower material layers 230, 240 prior to being placed together, moulded, and stiffened to produce an electrical harness raft 200. FIG. 7 shows a cross-section through the electrical harness raft 200 produced by the FIG. 6 arrangement, for example after stiffening treatment.

In the FIGS. 6 and 7 arrangement, the electrical conductors 210 take a variety of different forms and/or are provided in a variety of different ways. The conductor 210 on the left hand side of FIGS. 6 and 7 is provided with a sheath, or coating, or sleeve 212. The sleeve 212 may provide protection to the conductor 210 and/or electrical insulation. The conductor 210 second from the left in FIGS. 6 and 7 is unprotected. Thus, the conductor 210 second from the left in FIGS. 6 and 7 may be, for example, a conductive (for example metal, for example copper) wire laid directly into the rigid composite material 220.

The other conductors 210 in the example shown in FIGS. 6 and 7 may be provided as part of (or in) a flexible printed circuit (FPC) 250, which may be referred to as a flexible printed circuit board (or FPCB) 250. The FPC 250 comprises conductors 210, which may be in the form of conductive tracks, laid into a flexible substrate 255. The FPC 250 itself may be flexible. It will be appreciated that the electrical harness raft 200 may comprise any number of any one or more of the sleeved 212 or un-sleeved conductors 210 or flexible printed circuits 250.

As discussed in greater detail below, for example in relation to FIG. 12, flexible printed circuits may additionally or alternatively be used to connect two or more electrical harness rafts 200 of an electrical harness raft assembly 290 together. The basic structure of flexible printed circuits 250 used to connect rafts 200 together and to be embedded in the rafts 200 themselves may be substantially the same, as discussed below in relation to FIGS. 8 to 11. Thus, the description of a flexible printed circuit (or flexible printed circuit board) 250 below in relation to FIGS. 8 to 11 may apply to flexible printed circuits used as flexible cables to connect rafts 200 together, or to flexible printed circuits laid into the rafts 200.

Figure 8:
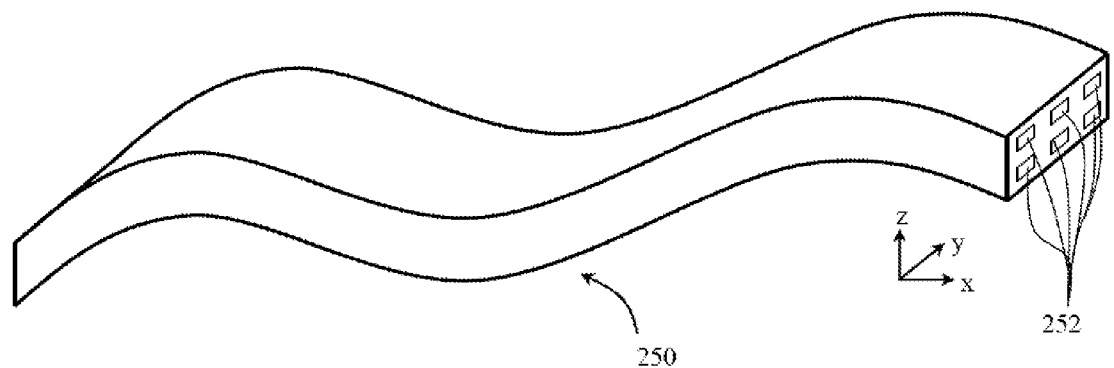
FIG. 8 shows a perspective view of a flexible printed circuit.
Figure 9:
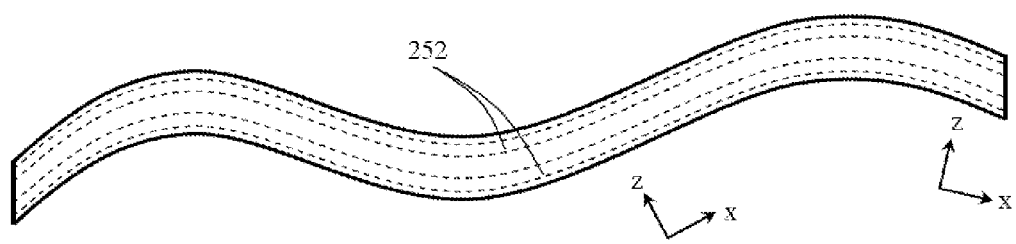
FIG. 9 shows a side view of the flexible printed circuit of FIG. 8.
Figure 10:
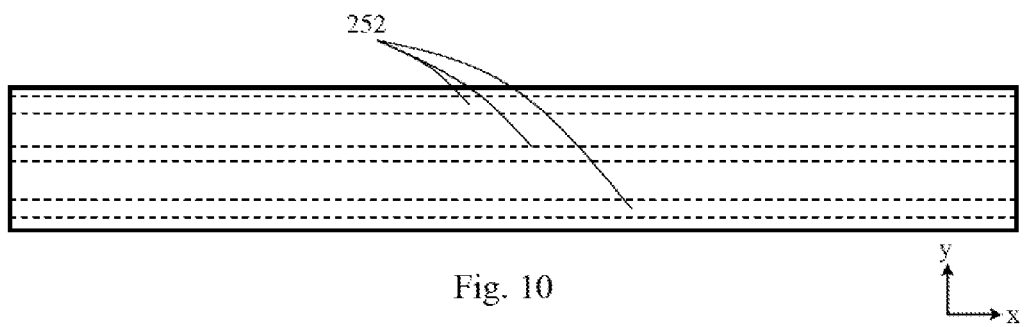
FIG. 10 shows a top view of the flexible printed circuit of FIG. 8.
Figure 11:
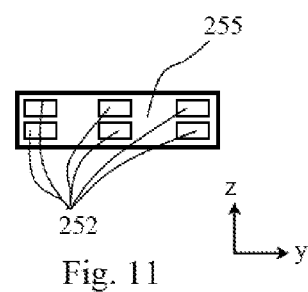
FIG. 11 shows a cross-sectional view of the flexible printed circuit of FIG. 8.

FIG. 8 shows a perspective view of a portion of a flexible printed circuit (FPC) 250, and FIGS. 9, 10, and 11 show side, top, and cross-sectional views respectively.

Such an FPC 250 may comprise a flexible (for example elastically deformable) substrate 255 with conductive tracks 252 laid/formed therein. The FPC 250 may thus be deformable. The FPC may be described as a thin, elongate member and/or a sheet-like member. Such a thin, elongate member may have a major surface defined by a length and a width, and a thickness normal to the major surface. In the example shown in FIGS. 8 to 11, the FPC 250 may extend along a length in the x-direction, a width in the y-direction, and a thickness (or depth or height) in the z-direction. The x-direction may be defined as the axial direction of the FPC. Thus, the x-direction (and thus the z-direction) may change along the length of the FPC 250 as the FPC is deformed. This is illustrated in FIG. 9. The x-y surface(s) (ie the surfaces formed by the x and y directions) may be said to be the major surface(s) of the FPC 250. In the example shown in FIGS. 8 to 11, the FPC is deformable in the z direction, i.e. in a direction perpendicular to the major surface. FPCs may be additionally of alternatively deformable about any other direction, and/or may be twisted about any one or more of the x, y, or z directions.

The flexible substrate 255 may be a dielectric. The substrate material may be, by way of example only, polyamide. As will be readily apparent, other suitable substrate material could alternatively be used.

The conductive tracks 252, which may be surrounded by the substrate 255, may be formed using any suitable conductive material, such as, by way of example only, copper, copper alloy, tin-plated copper (or tin-plated copper alloy), silver-plated copper (or silver-plated copper alloy), nickel-plated copper (or nickel-plated copper alloy) although other materials could alternatively be used. The conductive tracks 252 may be used to conduct/transfer electrical signals (including electrical power and electrical control signals) through the electrical harness raft(s) 200, for example around a gas turbine engine 10 and/or to/from components of a gas turbine engine and/or an airframe attached to a gas turbine engine.

The conductive tracks 252 shown in FIGS. 8 to 11 may be equivalent to the conductive tracks 210 shown in the FPC 250 laid in the raft 200 of FIG. 7. Additionally or alternatively, the conductive tracks 252 shown in the FPC of FIGS. 8 to 11 may be used to transfer electrical signals between electrical harness rafts 200, for example by using the FPC 250 as a flexible cable to connect two or more rafts 200 together.

The size (for example the cross-sectional area) and/or the shape of the conductive tracks 252 may depend on the signal(s) to be transmitted through the particular conductive track 252. Thus, the shape and/or size of the individual conductive tracks 252 may or may not be uniform in a FPC 250.

The example shown in FIGS. 8 to 11 has 6 conductive tracks 252 running through the substrate 255. However, the number of conductive tracks 252 running through a substrate 255 could be fewer than 6, or greater than 6. Indeed the number of conductive tracks 252 could be far greater than 6, for example tens or hundreds of tracks, as required. As such, many electrical signals and/or power transmission lines may be incorporated into a single FPC 250.

A single FPC 250 may comprise one layer of tracks, or more than one layer of tracks, for example, 2, 3, 4, 5, 6, 7, 8, 9, 10 or more than 10 layers of tracks. An FPC may comprise significantly more than 10 layers of tracks, for example at least an order of magnitude more layers of tracks. In this regard, a layer of tracks may be defined as being a series of tracks that extend in the same x-y surface. Thus, the example shown in FIGS. 8 to 11 comprises 2 layers of tracks, with each layer comprising 3 tracks 252.

Figure 12:
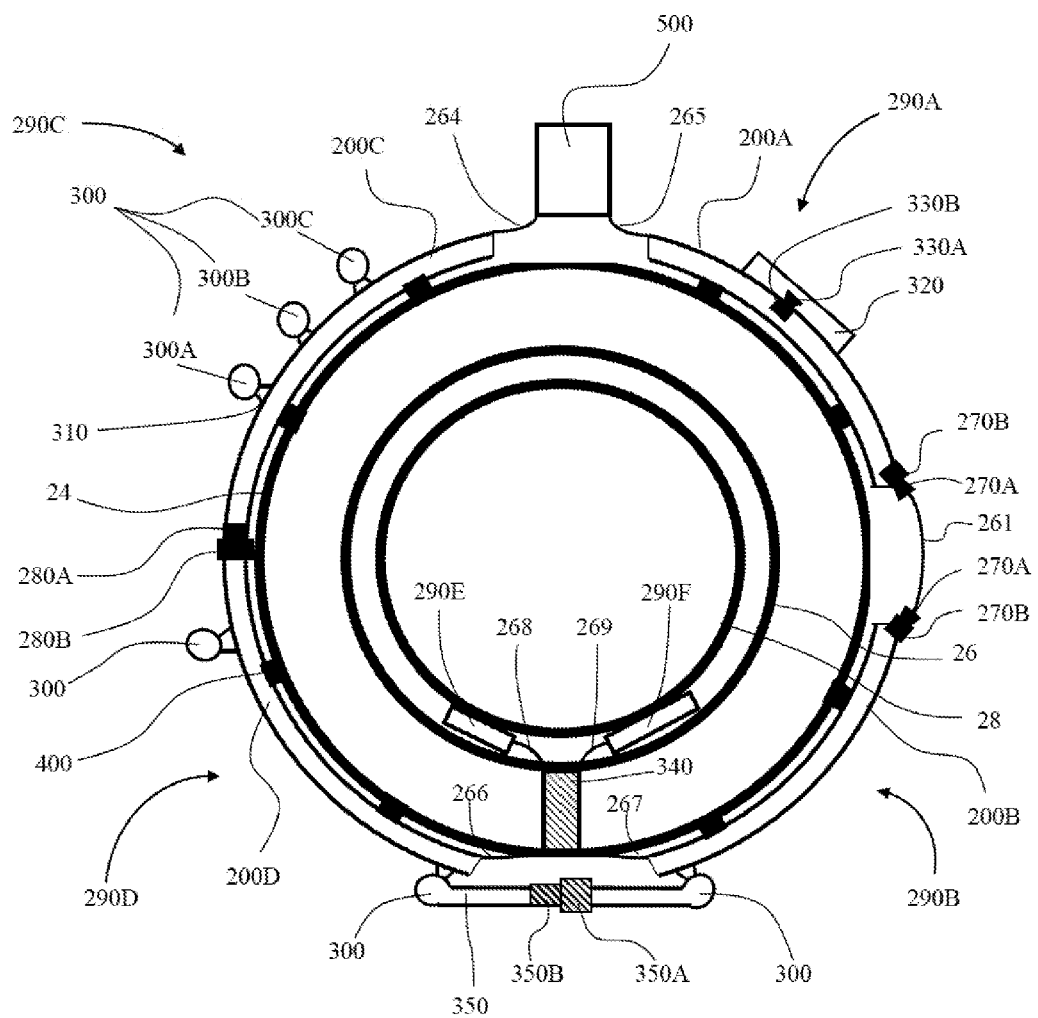
FIG. 12 shows a cross-section through a gas turbine engine according to an embodiment of the invention.

FIG. 12 is a schematic showing a cross-section perpendicular to the direction X-X of a gas turbine engine comprising electrical harness rafts. FIG. 12 shows four rigid raft assemblies in the form of electrical harness raft assemblies 290A, 290B, 290C, 290D (which may be referred to collectively as electrical harness raft assemblies 290), each of which comprises an electrical harness raft 200A, 200B, 200C, 200D (which may be referred to collectively as electrical harness rafts 200). Each electrical harness raft 200A, 200B, 200C, 200D comprises electrical conductors in a rigid material. For example, each electrical harness raft 200A, 200B, 200C, 200D may be as described herein, for example as described above in relation to FIGS. 3-7 in particular. Each electrical harness raft 200A, 200B, 200C, 200D is arranged (for example manufactured) to have a shape that corresponds to at least a part of the fan casing 24 of the engine 10 to which it is attached.

In the FIG. 12 example, two of the electrical harness rafts 200A, 200B are electrically connected together using a flexible cable (which may be referred to as a "flying lead") 261. The flexible cable 261 may be referred to as a connection cable. Flexible cables 261 may provide electrical connection between two (or more) electrical harness rafts 200A, 200B and/or between electrical harness raft(s) and other components, for example other components of a gas turbine engine 10 or other components of a related structure, such as an airframe.

The flexible cable 261 may take any suitable form, For example, the flexible cable 261 may comprise a flexible printed circuit, such as the flexible printed circuit 250 described above in relation to FIGS. 8 to 11. Additionally or alternatively, the flexible cable 261 may comprise one or more conductive wires surrounded by an insulating sleeve. In the same engine installation, and indeed between two components (such as two electrical harness rafts 200), some flexible cables 261 may be flexible printed circuits, and others may be insulated wires. In a gas turbine installation having more than one electrical harness raft assembly 290 none, some, or all of the electrical harness raft assemblies 290 may be connected together using one or more flexible cables 261. Alternatively or additionally, and optionally on the same engine installation, other suitable connection arrangements/methods could be used to connect (for example electrically connect) such components together. Of course, rigid raft assemblies 290 that do not have electrical conductors embedded therein may not need electrical connection between the rigid rafts, although components/systems mounted on the rigid rafts may still require electrical connection to other components.

The connection, for example the electrical connection, between a flexible cable 261 and an electrical harness raft 200 may take any suitable form. For example, an electrical harness raft 200 may be provided with an electrical connector, or socket, which is connected to (for example receives or is received by) a corresponding connector or socket of the respective flexible cable 261. A schematic example of such an arrangement is shown in FIG. 12 in relation to the flexible cable 261. The flexible cable 261 has an electrical connector 270A provided at either end. These electrical connectors 270A are connected to corresponding electrical connectors 270B in the electrical harness rafts 200A, 200E being connected together. In this way, electrical conductors 210 of the electrical harness rafts 200A, 200B may be electrically connected to the flexible cable 261, and thus to each other. The electrical connectors 270B may be provided to the electrical harness rafts 200A, 200B in any suitable manner, for example they may be embedded in the rigid material of the rafts 200A, 200B.

The rigid raft assemblies 290 may be connected or provided to the rest of the gas turbine engine 10 in any suitable manner. In the FIG. 12 example, the electrical harness raft assemblies 290 are connected to the gas turbine engine 10 using mounts 400. The mounts 400 could take any suitable form. For example, the mounts 400 in the FIG. 12 example may be anti-vibration mounts, so as to reduce/substantially eliminate the vibration transferred to the respective electrical harness raft assembly 290. In the FIG. 12 example, each rigid raft assembly 290A, 290B, 290C, 290D is provided with at least two respective mounts 400 (only one of those used to mount raft assembly 290D is labelled for clarity) for mounting each rigid raft assembly 290 to the rest of the gas turbine engine 10. However, any suitable number of mounts 400 may be used as required, for example 1, 2, 3, 4, 5, 6, 7, 8, 9, 10 or more than 10 mounts 400 per rigid raft assembly 290.

One or more rigid raft assembly 290, such as one or more electrical harness raft assemblies 290, may be provided to (for example attached to/embedded within) any part/region/component of a gas turbine engine/gas turbine engine installation 10, for example using mounts 400. In the FIG. 12 example, electrical harness raft assemblies 290 are connected to a fan casing 24 of the gas turbine engine 10. As such, the mounts 400 may be provided between the fan casing 24 and the respective rigid raft assembly 290.

In the FIG. 12 example, electrical harness raft assemblies 290E, 290F are provided on the core casing 28. As is shown in the figure, the electrical harness raft assemblies 290E, 290F may be directly attached to only the core casing 28, and not the fan casing 24. Thus, electrical harness raft assemblies 290E, 290F are provided between the engine core casing 28 and the engine core fairing 26. As is also shown in the figure, the electrical harness raft assemblies 290A, 290B, 290C, 290D may be directly attached to only the fan casing 24, and not the core casing 28. Electrical signals may be passed from the electrical harness raft assemblies 290A, 290B, 290C, 290D mounted on the fan casing 24 to the electrical harness raft assemblies 290E, 290F mounted on the core casing 28. In the FIG. 12 example, this may be achieved by passing the electrical signals through a bifurcation or splitter 340 in the bypass duct 22, which may be formed at least in part by an outlet guide vane spanning the bypass duct 22. The bifurcation 340 may comprise, for example have embedded therein or be formed at least in part by, an electrical harness raft, such as any of the electrical harness rafts 200 described herein. Such an electrical harness raft 200 embedded in the bifurcation 340 may be connected to the fan casing raft assemblies 290D, 290B and the core casing raft assemblies 290E, 290F using flexible cables 266, 267, 268, 269. Indeed, any type of rigid raft assembly 290 may be provided in the bifurcation 340.

Connection between raft assemblies 290A, 290B, 290C, 290D mounted on the fan casing 24 to the raft assemblies 290E, 290F mounted on the core casing 28 may be provided at least in part by means other than an additional electrical harness raft, for example using wire conductors with insulating sleeves.

Purely by way of non-limitative example only, rigid raft assemblies 200, 290 may additionally or alternatively be provided on/attached to/embedded within the engine core casing 28, the engine core fairing 26, the bifurcation between the engine core and the engine fan case, nose cone, structural frames or elements within the engine (such as "A-frames"), the nacelle, the fan cowl doors, and/or any connector or mount between the gas turbine engine 10 and a connected structure (which may be at least a part of a structure in which the gas turbine engine 10 is installed), such as the pylon 500 between the gas turbine engine 10 and an airframe (not shown). For the avoidance of doubt, the pylon 500, together with other connections or mounts between the gas turbine engine 10 and a connected structure (such as an airframe) may be a part of a gas turbine engine or gas turbine engine installation as referred to herein.

In the FIG. 12 example, two of the flexible cables 264, 265 are connected (for example electrically and/or mechanically connected) to the pylon 500. Thus, the electrical harness raft assemblies 290 may be connected to an airframe (or aircraft, or other structure/vehicle) to which the pylon 500 is connected. The pylon 500 itself have one or more electrical harness raft assemblies 290 embedded therein and/or attached thereto. Additionally or alternatively, a component to which the gas turbine engine/gas turbine engine installation 10 is attached (such as an airframe) may be provided with one or more electrical harness rafts.

In FIG. 12, the rigid raft of at least one of the electrical harness raft assemblies 290 is used to mount other components/systems (or dressings) of the gas turbine engine 10. In general, any component/system, or a part thereof, of the gas turbine engine 10 could be mounted on/to (for example physically/mechanically mounted/connected and/or electrically connected) one or more rigid raft assemblies 200/290, any one or more of which may be an electrical harness raft 200. As discussed herein, as well as providing a particularly compact, easy to assemble and lightweight mounting solution, mounting components/systems at least in part on a raft 200 may provide vibration isolation/damping to those components, for example if the mounts 400 used to attach the raft 200 to the rest of the engine 10 are anti-vibration mounts.

The electrical harness raft assemblies 290 comprise components/systems mounted to the rafts 200 which, purely by way of non-limitative example, in the FIG. 12 example include an Electronic Engine Controller (or EEC, which may be an Electronic Control Unit, or ECU) 320 and fluid pipes 300. The EEC 320 may be used to communicate electronic signals (for example electronic control signals) with the rest of the engine, for example through the electronic harness rafts 200. The fluid pipes 300 may be used to transport any liquid, gas, or mixture thereof, around the gas turbine engine installation 10.

The EEC 320 may be electrically connected to the electrical harness raft 200A on which it is located in any suitable manner. For example an electrical connector 330A provided to (for example embedded in) the EEC 320 may be connected to a corresponding, or complimentary, electrical connector 330B provided to (for example embedded in) the electrical harness raft 200A. The connector 330B provided to the electrical raft harness 200A may be in electrical connection with at least some of the electrical conductors 210 embedded therein. The connector 330A provided to the EEC 320 may be in electrical connection with electrical or electronic circuits (for example control circuits) in the EEC 320. Thus, circuits in the EEC 320 can be in communication with other components through a electronic raft harness 200, thereby allowing signals (for example control/communication signals) to be transferred between the EEC 320 and the gas turbine engine installation 10 (and optionally to other components/parts to which the gas turbine engine installation is attached). The connectors 330A, 330B may take any suitable form/shape, such as that described above in relation to the connectors 270A/270B connecting the flexible cable 261 to the rafts 200A, 200B. The EEC 320 may be mechanically connected to the electrical harness raft 200A, for example by embedding the EEC 320 into the electrical harness raft 200A and/or by using suitable mounts/brackets. The EEC 320 could be another type of ECU, such as an engine health monitoring unit (EMU).

As mentioned herein, the fluid pipes/conduits 300 may be used to transport any fluid around the engine as desired. FIG. 12 shows 3 pipes 300A, 300B, 300C extending in a substantially axial direction relative to the engine 10. Any number of pipes could be mounted onto a raft 200, for example 1, 2, 3, 4, 5, 6, 7, 8, 9, 10 or more than 10 pipes. Furthermore, pipes 300 could be mounted in any suitable direction, as desired. For example, in FIG. 2, pipes 300 are shown as extending circumferentially around the engine 10, whereas in FIG. 12, pipes 300 are shown extending axially along the engine 10. Each pipe 300 may be provided to the rigid raft assembly 290 in any suitable manner, for example the pipes 300 may be mounted to the rigid raft assembly 290, for example using a bracket.

FIG. 12 also shows a mechanical (in this case fluid) connection 350 between two pipes 300. The fluid connection 350 is provided by two connectors 350A, 350B. This is one example of how systems/components incorporated in one rigid raft assembly 290B can be connected to other systems/components (or other parts of the same system/component) incorporated in another rigid raft assembly 290D. Other connection methods may, of course, be used instead of that shown explicitly in FIG. 12. In the example of FIG. 12, the two rigid raft assemblies 290B, 290D that have components 300 mounted thereon and connected together 350 are electrical harness raft assemblies, but this need not be the case. For example, the two rigid rafts 200B, 200D may not have electrical conductors 210 embedded therein.

As mentioned elsewhere herein, any suitable component/system or part thereof could be part of a rigid raft assembly 290 (which may be an electrical raft assembly 290). By way of non-limitative example only, a rigid raft assembly 290 could have electrical cables mounted thereon, for example to carry electrical signals that are not carried using conductors 210 in an electrical harness raft 200.

FIG. 12 also illustrates a direct electrical connection 280A, 280B between two electrical harness rafts 200C, 200D. The direct connection may be between a connector or socket 280A provided with one raft 200C, and a complimentary connector or socket 280B provided with another raft 200D. The connectors 280A, 280B may be provided in any suitable manner, for example they may be embedded in the respective raft 200. Using direct connection between the rafts may avoid the need for flexible connecting cables 261 where they are not required or appropriate. Thus, for example, an engine installation 10 may have some raft assemblies 290A, 290B connected using a flexible cable 261, and other raft assemblies 290C, 290D directly connected together.

Figure 13:
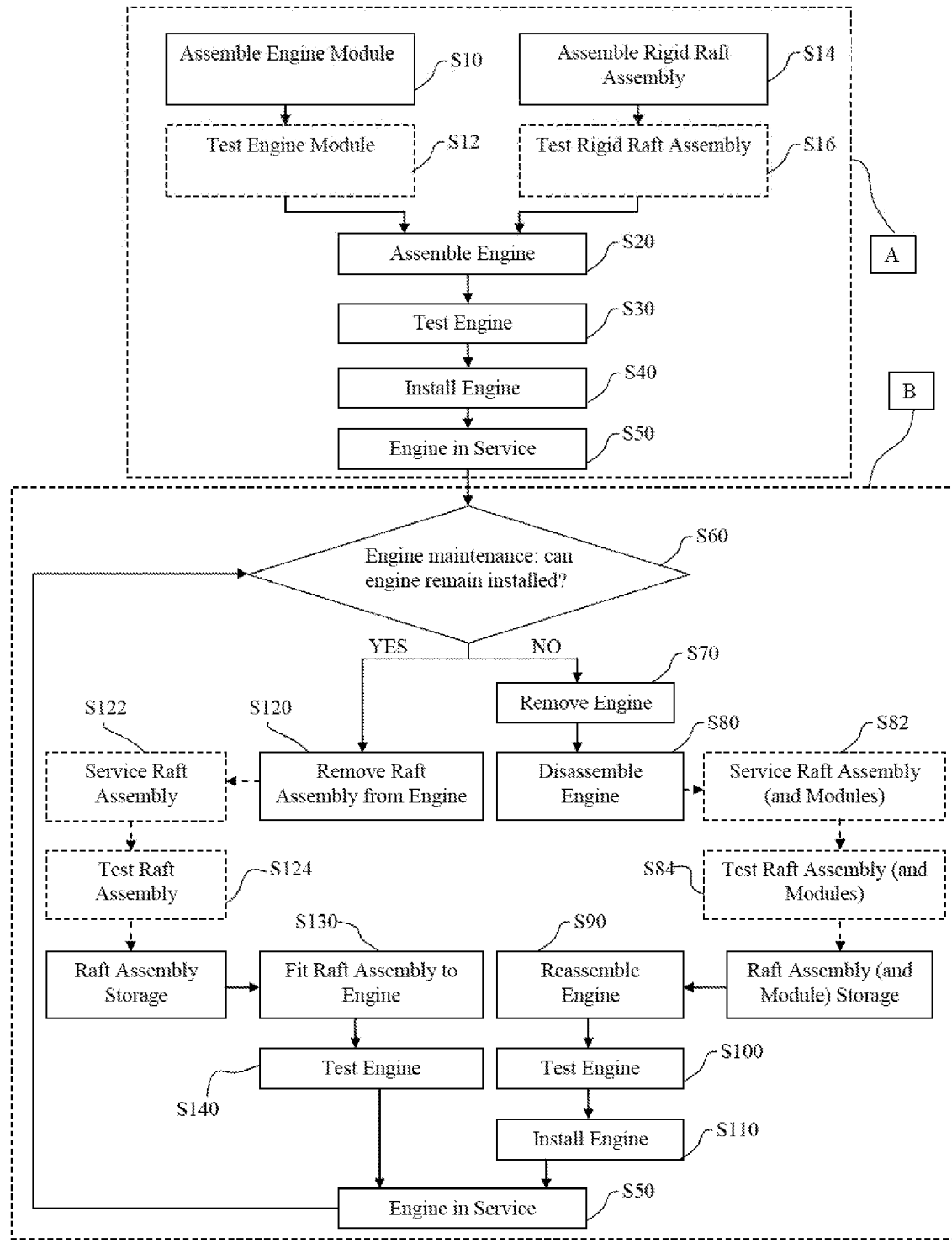
FIG. 13 is a flow chart showing an example of a process for assembling and/or servicing a gas turbine engine including a rigid raft assembly.

FIG. 13 is a flow chart that represents an example of a process for assembling and/or dressing and/or maintaining (servicing) a gas turbine engine.

Step S10 involves assembling modules, which may be units, systems, subsystems or components, of a gas turbine engine. The modules may be, by way of example only, any type of compressor, fan, combustor, or turbine module. The modules may then be tested for correct operation if appropriate in step S12. Some modules may not require or be suitable for testing.

Figure 14:
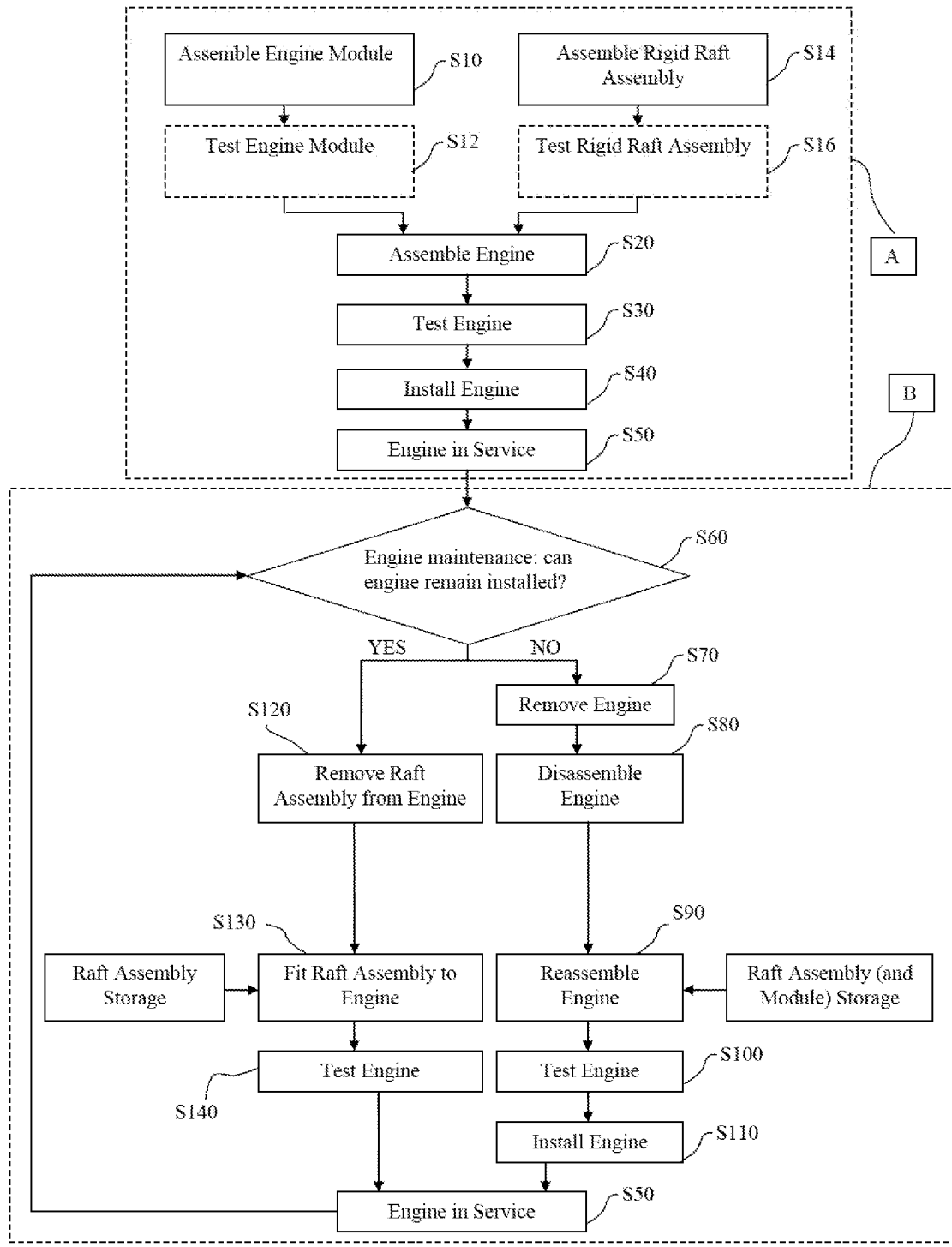
FIG. 14 is a flow chart showing an example of a process for assembling and/or servicing a gas turbine engine including a rigid raft assembly.

In step S14, which may, for example, be performed at the same time as step S10 and/or step S12, one or more rigid raft assemblies 290 (which may be referred to simply as "raft assemblies 290" in relation to FIGS. 13 and 14 for convenience) are assembled/produced. This may involve manufacture of the base rigid raft (which may be an electrical harness raft 200) and/or dressing a raft, for example with pipe(s) 300 and/or ECU(s) 320. For example, systems and/or components may be mounted to rigid rafts at this stage to produce a rigid raft assembly, which may be an electrical harness raft assembly 290. Once again, an electrical harness raft 200/290 without any additional components mounted thereon may also be a rigid raft assembly 290.

In step S16, the assembled rigid raft assembly 290 may (optionally) be tested. Any suitable test may be performed, for example testing electrical functioning of the raft 200, which may involve testing electrical conductors 210 embedded in the rigid material 220. The testing step S16 may additionally or alternatively involve appropriate testing of any components/systems incorporated in the rigid raft assembly 290. The assembled (and optionally tested) rigid raft assemblies may then be stored until required for assembly on an engine.

Steps S14 and S16 may be completely independent on steps S10 and S12, for example performed at the same or different times, and in the same or different locations/facilities.

In step S20, the engine is assembled. This may involve assembling the modules and the rigid raft assembly (or assemblies) produced in steps S10 and S14 together.

This may involve, for example, connecting the modules, raft assemblies, and any other components of the gas turbine engine together. The or each rigid raft assembly may be attached (for example connected to or mounted on) the appropriate part of the gas turbine engine (which may be a module) before that part (or module) is attached to the rest of the engine. Alternatively, the modules and/or components of the gas turbine engine may be connected together before installing the rigid raft assembly 290. Indeed, any suitable assembly method may be used. The engine assembly step S20 may also involve connecting components mounted on the raft 200 to corresponding components of the gas turbine engine. For example, it may involve connecting fluid pipes 300 to other parts of a fluid system, which may be incorporated in (for example mounted on) other rigid raft assemblies 290.

After the engine has been assembled, it may be tested in step S30. Step S30 may involve testing the performance and/or reliability of the assembled gas turbine engine 10, and/or any part/system thereof. Step S30 may, in some cases, be omitted.

The gas turbine engine 10 is then installed into (or assembled with) the installation in which it is to be used in step S40. This may involve, for example, installing the gas turbine engine 10 into a vehicle, such as an aircraft and/or a boat/ship and/or a roadgoing vehicle. Alternatively, step S40 may involve installing the gas turbine engine 10 into, for example, an industrial application, such as a power station. In step S50, the installed engine is used in service in whichever application it is installed.

Steps S10-S50 may be referred to as a self contained process A for assembling (including, for example, dressing) a gas turbine engine. Steps S60-S140, described in more detail below, relate to an engine maintenance process B, which may be independent of process A or may be used as a subsequent process to process A.

In step S60, a decision is made with regard to whether the particular maintenance procedure requires the engine to be removed from the installation, for example one which requires the engine to be removed from an aircraft. In either case, the maintenance procedure is one that will require at least one rigid raft assembly 290 to be removed. If the engine cannot remain installed (S60=NO), then it is removed in step S70. Removal of the engine in step S70 may comprise, amongst other things, disconnecting (for example electrically and/or mechanically disconnecting) the rigid raft assembly (or assemblies) from mounting structures, such as an aircraft pylon 500, and/or from other rigid raft assemblies that form part of the structure (such as an aircraft) to which the engine 10 is attached.

In step S80, the removed engine is disassembled. The level of disassembly may depend on the type of maintenance to be performed. The step S80 may involve removing the rigid raft assemblies 290 from the engine 10. Modules (such as components and/or systems) of the gas turbine engine may also be removed at this stage.

In step S82, any raft assemblies and/or modules (or indeed any other components/systems) are serviced. Servicing may mean inspecting, repairing, or overhauling. The serviced raft assemblies (or other components) may then be tested in step S84, for example in a similar manner to as described above in relation to steps S12 and/or S16.

After servicing and optionally testing, the rigid raft assembly 290 may go into storage. The rigid raft and dressings (where included in a dressed rigid raft assembly 290) that may form the rigid raft assembly 290 may be stored assembled as a raft assembly 290 or separately. Similarly, other serviced components/modules may be placed into storage.

Steps 82 and 84 are shown as dashed because they may not be required for the engine that has been disassembled in step S80 to be reassembled in step S90, as explained below. A process in which steps S82 and S84 (along with analogous step S122 and S124, which are explained below) are explicitly omitted is shown in FIG. 14, which is otherwise the same as FIG. 13 and thus will not be explained in detail.

In step S90, the engine 10 is reassembled. One or more rigid raft assemblies 290 that have been stored or prepared for the reassembly may be used in step S90. Thus, the raft assembly 290 that is refitted to the engine during reassembly in step S90 (or step S130 explained below) may not be the same raft assembly 290 that was removed from the engine in step S80. The raft assembly 290 that was removed from the engine in step S80 may be serviced in step S82 and/or tested in step S84 at the same time as (or even after) the engine is reassembled in step S90, for example with another, pre-prepared raft assembly 290. Indeed, the raft assembly 290 that was removed from the engine in step S80 may ultimately be put onto a different gas turbine engine 10 in a fleet at some future time after being optionally serviced, tested and/or stored.

By using a different, pre-prepared, raft assembly 290 to rebuild/reassemble the engine in step S90/S130, the process may be significantly speeded-up, for example because it is not necessary for the original raft assembly 290 to be serviced before the engine can be reassembled. The pre-prepared rigid raft assembly 290 may simply need to be attached/connected to the rest of the engine in steps S90/S130. Alternatively, some components or systems may require mounting on the pre-prepared rigid raft assembly in steps S90/S130, although such steps should be relatively straightforward. For example, for convenience of storage and/or assembly, it may be preferable to attach some systems/components to the raft assembly 290 at the same time as attaching it to the engine.

However, the raft assembly 290 that was removed in step S80 may be refitted to the engine in step S90, for example if it did not require servicing (or was not scheduled to be serviced), and/or was only removed to allow another part of the engine to be accessed/serviced.

After reassembly of the engine in step S90, the engine 10 may be tested in step S100 and (re-)installed in step S110. Steps S100 and S110 may substantially correspond to steps S30 and S40 described above in relation to engine assembly.

If, in step S60, it is decided that the engine maintenance can be performed with the engine still installed, then the process moves to step S120, in which the rigid raft assembly 290 is removed from the engine. The rigid raft assembly 290 may be removed as a whole, or by first removing the dressings 300, 320 (where fitted), then removing the raft 200.

The removed raft assembly 290 may then (optionally) be serviced and tested in steps S122 and S124, and then optionally stored. The service (S122), testing (S124) and storage may be substantially as described above in relation to steps S82 and S84. Other components/systems of the engine 10 may be serviced/repaired, for example whilst the raft assemblies are not attached to the engine.

In step S130, a rigid raft assembly 290 is fitted to the engine 10. Once again, as with step S90, the raft assembly 290 that is fitted to the engine 10 may not be the same one that was removed in step S120 (although it may be of substantially the same, or an updated, specification). The raft assembly 290 that is removed from the engine 10 in step S120 may subsequently be fitted to a different engine 10 (for example after any of the steps of servicing, testing, and storing the raft assembly).

After refitting a rigid raft assembly 290 to the engine, the engine may be tested in step S140 (as described above in relation to step S30), and the engine may then return to service in step S50.

FIG. 13 may represent an assembly and maintenance procedure for a single engine and/or for an engine that is part of a fleet, for example engines provided to a fleet of aircraft. The raft assemblies 290 (and other modules) that are held in storage may move between engines as the fleet is serviced, such that a single raft may be attached to a number of different engines during its lifetime. Thus, the rigid raft assembly (or assemblies) may be said to be "ratable".

It will be appreciated that assembly/maintenance procedures other to that set out in FIG. 13 may also be used to assemble a rigid raft assembly 290 together with an engine and to repair/provide maintenance to the engines 10/raft assemblies 290.

Where reference is made herein to a gas turbine engine or a gas turbine engine installation, it will be appreciated that this term may include a gas turbine engine and/or any peripheral components to which the gas turbine engine may be connected to or interact with and/or any connections/interfaces with surrounding components, which may include, for example, an airframe and/or components thereof. Such connections with an airframe include, but are not limited to, pylons and mountings and their respective connections. The gas turbine engine itself may be any type of gas turbine engine, including, but not limited to, a turbofan (bypass) gas turbine engine, turbojet, turboprop, ramjet, scramjet or open rotor gas turbine engine, and for any application, for example aircraft, industrial, and marine application.

It will be appreciated that many alternative configurations and/or arrangements of rigid raft assemblies 290, and methods of assembly thereof, and gas turbine engines comprising rigid raft assemblies 290, including methods of assembly and servicing thereof, other than those described herein may fall within the scope of the invention. For example, alternative arrangements and methods of construction of rigid rafts 200 (for example in terms of construction, layout and/or shape of conductors 210 (where present) and/or rigid material 220 and/or the resulting raft 200) may fall within the scope of the invention and may be readily apparent to the skilled person from the disclosure provided herein. Alternative arrangements of connections between the rigid raft assemblies 200/290 and between the rigid raft assemblies 200/290 and other components may fall within the scope of the invention and may be readily apparent to the skilled person from the disclosure provided herein. Furthermore, any feature described and/or claimed herein may be combined with any other compatible feature described in relation to the same or another embodiment.

We claim:

1. A method of servicing a gas turbine engine, the method comprising:
   removing a first rigid raft assembly that is directly attached to only one of a fan casing or a core casing from the gas turbine engine, the rigid raft assembly incorporating at least a part of at least one component or system of the gas turbine engine; and
   installing a second, pre-prepared, rigid raft assembly directly onto the one of the fan casing or the core casing of the gas turbine engine in place of the first raft assembly,
   wherein the first and second rigid raft assemblies are electrical harness raft assemblies having electrical conductors embedded in a rigid material so as to be surrounded by, and fixed in position by, the rigid material along an entire length of the electrical conductors, the electrical conductors being at least a part of an electrical system arranged to transfer electrical signals around the engine.

2. The method of servicing a gas turbine engine according to claim 1, wherein the first and second rigid raft assemblies are dressed rigid raft assemblies comprising a rigid mounting surface on which at least a part of at least one of the components or systems of the gas turbine engine is mounted.

3. The method of servicing a gas turbine engine according to claim 2, wherein the rigid mounting surface of each of the first and second rigid raft assemblies has a pipe for transferring fluid around the engine attached thereto, the pipe being at least a part of a fluid transfer system.

4. The method of servicing a gas turbine engine according to claim 3, wherein:
   the step of removing the first rigid raft assembly comprises disconnecting the respective pipe from another part of the fluid transfer system; and
   the step of installing the pre-prepared second raft assembly comprises connecting the respective pipe the other part of the fluid transfer system.

5. The method of servicing a gas turbine engine according to claim 2, wherein each of the first and second rigid raft assemblies has, attached to its respective rigid mounting surface, one or more of the following components or systems selected from the group consisting of: an ECU; a fire detection system; a thermocouple; a vibration monitoring system; a fluid pressure monitoring system; and a fluid quality measuring system for monitoring fluid pressure in pipes mounted to the respective rigid raft assembly.

6. The method of servicing a gas turbine engine according to claim 1, further comprising:
   removing the gas turbine engine on which the first rigid raft assembly is installed from an airframe before the step of removing the first rigid raft assembly from the gas turbine engine; and
   refitting that gas turbine engine to an airframe after the step of installing the second, pre-prepared, rigid raft assembly thereon.

7. The method of servicing a gas turbine engine according to claim 1, wherein:
   the first rigid raft assembly has an electrical harness raft which comprises electrical conductors arranged to transfer electrical signals around the engine embedded in a rigid material, the first electrical harness raft assembly being electrically connected to another electrical component of the gas turbine engine using a flexible cable; and
   the step of removing the first rigid raft assembly from the gas turbine engine comprises disconnecting the flexible cable from the first electrical harness raft.

8. A method of servicing a fleet of gas turbine engines, the method comprising:
   removing a first rigid raft assembly that is directly attached to only one of a fan casing or a core casing from the gas turbine engine, the rigid raft assembly incorporating at least a part of at least one component or system of the gas turbine engine; and
   installing a second, pre-prepared, rigid raft assembly directly onto the one of the fan casing or the core casing of the gas turbine engine in place of the first raft assembly,
   servicing the first rigid raft assembly that has been removed from the first gas turbine engine; and
   installing the serviced first rigid raft assembly onto a second gas turbine engine,
   wherein the first and second rigid raft assemblies are electrical harness raft assemblies having electrical conductors embedded in a rigid material so as to be surrounded by, and fixed in position by, the rigid material along an entire length of the electrical conductors, the electrical conductors being at least a part of an electrical system arranged to transfer electrical signals around the engine.

9. The method of servicing a fleet of gas turbine engines according to claim 8, wherein
   the step of servicing the first rigid raft assembly comprises removing engine dressings from the first rigid raft assembly.

10. The method of servicing a fleet of gas turbine engines according to claim 8, further comprising:
    removing the gas turbine engine on which the first rigid raft assembly is installed from an airframe before the step of removing the first rigid raft assembly from the gas turbine engine; and
    refitting that gas turbine engine to an airframe after the step of installing the second, pre-prepared, rigid raft assembly thereon.

11. The method of servicing a fleet of gas turbine engines according to claim 8, wherein:
    the first rigid raft assembly has an electrical harness raft which comprises electrical conductors arranged to transfer electrical signals around the engine embedded in a rigid material, the first electrical harness raft assembly being electrically connected to another electrical component of the gas turbine engine using a flexible cable; and
    the step of removing the first rigid raft assembly from the gas turbine engine comprises disconnecting the flexible cable from the first electrical harness raft.

12. The method of servicing a fleet of gas turbine engines according to claim 8, wherein the method further comprises testing the serviced first rigid raft assembly before installing it onto the second gas turbine engine.

13. A method of dressing a gas turbine engine comprising:
    preparing a rigid raft assembly for installing on the gas turbine engine, the rigid raft assembly incorporating at least a part of at least one component or system of the gas turbine engine;
    storing the prepared rigid raft assembly in a storage facility; and
    when the gas turbine engine requires dressing, installing the prepared rigid raft assembly on the rest of the gas turbine engine such that the rigid raft assembly is attached directly to only one of a fan casing or a core casing, the prepared rigid raft assembly forming at least a part of the engine dressing, wherein the rigid raft assembly is an electrical harness raft assembly having electrical conductors embedded in a rigid material so as to be surrounded by, and fixed in position by, the rigid material along an entire length of the electrical conductors, the electrical conductors being at least a part of an electrical system arranged to transfer electrical signals around the engine.

14. The method of dressing a gas turbine engine according to claim 13, wherein the rigid raft assembly is a dressed rigid raft assembly comprising a rigid mounting surface on which at least a part of at least one of the components or systems of the gas turbine engine is mounted.

15. The method of dressing a gas turbine engine installation according to claim 13, wherein:
  the step of installing the prepared rigid raft assembly comprises connecting the rigid raft assembly, including the components and/or systems incorporated in the rigid raft assembly, to the gas turbine engine; and/or
  the step of installing the prepared rigid raft assembly comprises mounting the prepared rigid raft assembly to the rest of the gas turbine engine using at least one anti-vibration mount.

16. The method of dressing a gas turbine engine according to claim 13, comprising:
  preparing at least two rigid raft assemblies;
  installing at least two prepared rigid raft assemblies on the rest of the gas turbine engine; and
  electrically connecting the at least two prepared rigid raft assemblies together using at least one flexible cable.

* * * * *